US012640894B2

(12) United States Patent
Sengupta et al.

(10) Patent No.:  US 12,640,894 B2
(45) Date of Patent:      May 26, 2026

(54) UNIFIED TRANSMISSION CONFIGURATION INDICATOR (TCI) FRAMEWORK FOR MULTI-TRANSMISSION-RECEPTION POINT (TRP) OPERATION

(71) Applicant: Intel Corporation, Santa Clara, CA (US)

(72) Inventors: Avik Sengupta, San Jose, CA (US); Dong Han, San Jose, CA (US); Bishwarup Mondal, San Ramon, CA (US); Guotong Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/309,057

(22) Filed: Apr. 28, 2023

(65) Prior Publication Data

US 2023/0269057 A1      Aug. 24, 2023

Related U.S. Application Data

(60) Provisional application No. 63/336,985, filed on Apr. 29, 2022.

(51) Int. Cl.
H04L 5/00              (2006.01)

(52) U.S. Cl.
CPC .......... H04L 5/0092 (2013.01); H04L 5/0035 (2013.01); H04L 5/0053 (2013.01)

(58) Field of Classification Search
None
See application file for complete search history.

(56) References Cited

U.S. PATENT DOCUMENTS

| 2023/0216645 | A1 * | 7/2023 | Farag | .................... H04L 1/1812 |
| | | | | 370/329 |
| 2024/0154651 | A1 * | 5/2024 | Bai | ...................... H04B 7/0417 |
| 2024/0406889 | A1 * | 12/2024 | Yuan | ...................... H04W 52/48 |
| 2025/0142567 | A1 * | 5/2025 | Liu | ........................ H04W 76/20 |
| 2025/0167946 | A1 * | 5/2025 | Lim | ...................... H04L 5/0023 |

OTHER PUBLICATIONS

Samsung, "New WID: MIMO Evolution for Downlink and Uplink," 3GPP TSG RAN Meeting #94e, RP-213598 (revision of RP-213517), Agenda Item: 8A.1, Electronic Meeting, Dec. 6-17, 2021, 6 pages.

(Continued)

*Primary Examiner* — Saad Khawar
(74) *Attorney, Agent, or Firm* — Schwegman Lundberg & Woessner, P.A.

(57) ABSTRACT

Various embodiments herein provide techniques for a unified transmission configuration indicator (TCI) framework for multi-transmission-reception point (TRP) operation in a wireless cellular network. For example, embodiments may relate to use of a joint TCI codepoint to indicate one or more TCI states (e.g., a joint uplink (UL)/downlink (DL) TCI state, a UL TCI state, and/or a DL TCI state). The techniques may be used for multi-downlink control information (DCI) multi-TRP operation and/or single-DCI multi-TRP operation. Embodiments further relate to techniques for transmission repetition and uplink power control. Other embodiments may be described and claimed.

8 Claims, 13 Drawing Sheets

(56) References Cited

OTHER PUBLICATIONS

3GPP, "Technical Specification Group Radio Access Network; NR; Physical channels and modulation (Release 17)," 3GPP TS 38.211 V17.1.0 (Mar. 2022), 5G, 135 pages.
3GPP, "Technical Specification Group Radio Access Network; NR; Multiplexing and channel coding (Release 17)," 3GPP TS 38.212 V17.1.0 (Mar. 2022), 5G, 197 pages.
3GPP, "Technical Specification Group Radio Access Network; NR; Physical layer procedures for control (Release 17)," 3GPP TS 38.213 V17.1.0 (Mar. 2022), 5G, 245 pages.
3GPP, "Technical Specification Group Radio Access Network; NR; Physical layer procedures for data (Release 17)," 3GPP TS 38.214 V17.1.0 (Mar. 2022), 5G, 225 pages.
3GPP, "Technical Specification Group Radio Access Network; NR; Medium Access Control (MAC) protocol specification (Release 17)," 3GPP TS 38.321 V17.0.0 (Mar. 2022), 5G, 221 pages.

* cited by examiner

Single-DCI based scheme

| Serving Cell ID | BWP ID | | | | | | | |
|---|---|---|---|---|---|---|---|---|
| | PUCCH Resource ID | | | | | | | |
| R | R | T0 | T1 | T2 | T3 | T4 | T5 | T6 | T7 |

Figure 7

1100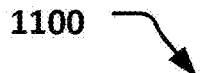

receiving a downlink control information (DCI) that includes a joint codepoint to indicate one or more first transmission configuration indicator (TCI) states for a first transmission-reception point (TRP) and one or more second TCI states for a second TRP
1102 receiving a first downlink (DL) transmission from the first TRP or transmit a first uplink transmission to the first TRP based on the one or more first TCI states
1104 receiving a second DL transmission from the second TRP or transmit a second uplink transmission to the second TRP based on the one or more second TCI states
1106

Figure 11

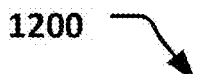
1200 receiving a first transmission configuration indicator (TCI) codepoint to indicate one or more first transmission configuration indicator (TCI) states for a first transmission-reception point (TRP), and a second TCI codepoint to indicate one or more second TCI states for a second TRP for multi-downlink control information (DCI) multi-TRP communication
1202 performing the multi-TRP communication based on the indicated one or more first TCI states and one or more second TCI states
1204

Figure 12

1300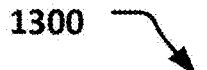

encoding, for transmission to a user equipment (UE), a downlink control information (DCI) that includes a joint codepoint to indicate one or more first transmission configuration indicator (TCI) states for a first transmission-reception point (TRP) and one or more second TCI states for a second TRP
1302 transmitting a first downlink (DL) transmission via the first TRP or receive a first uplink (UL) transmission via the first TRP based on the one or more first TCI states
1304

Figure 13

UNIFIED TRANSMISSION CONFIGURATION INDICATOR (TCI) FRAMEWORK FOR MULTI-TRANSMISSION-RECEPTION POINT (TRP) OPERATION

CROSS REFERENCE TO RELATED APPLICATION

The present application claims priority to U.S. Provisional Patent Application No. 63/336,985, which was filed Apr. 29, 2022; the disclosure of which is hereby incorporated by reference.

FIELD

Various embodiments generally may relate to the field of wireless communications. For example, some embodiments may relate to a unified transmission configuration indicator (TCI) framework for multi-transmission-reception point (TRP) operation.

BACKGROUND

In Third Generation Partnership Project (3GPP) Release (Rel)-17 New Radio (NR), a new unified transmission configuration indicator (TCI) framework was specified for common beam operation in both downlink (DL) and uplink (UL) through the use of joint DL/UL TCI states when the same beam is used in the DL/UL with full beam correspondence and with separate DL and UL TCI (replacing the uplink spatial relation information framework) for the case of no beam correspondence where a separate DL and UL beam are used. However, the Rel-17 unified TCI framework was supported for only single transmission-reception point (TRP) operation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 7 illustrates an example of a MAC CE for activation/ deactivation of PUCCH TCI states, in accordance with various embodiments.

FIGS. 11, 12, and 13 illustrate example processes to practice the various embodiments herein.

DETAILED DESCRIPTION

Figure 1:
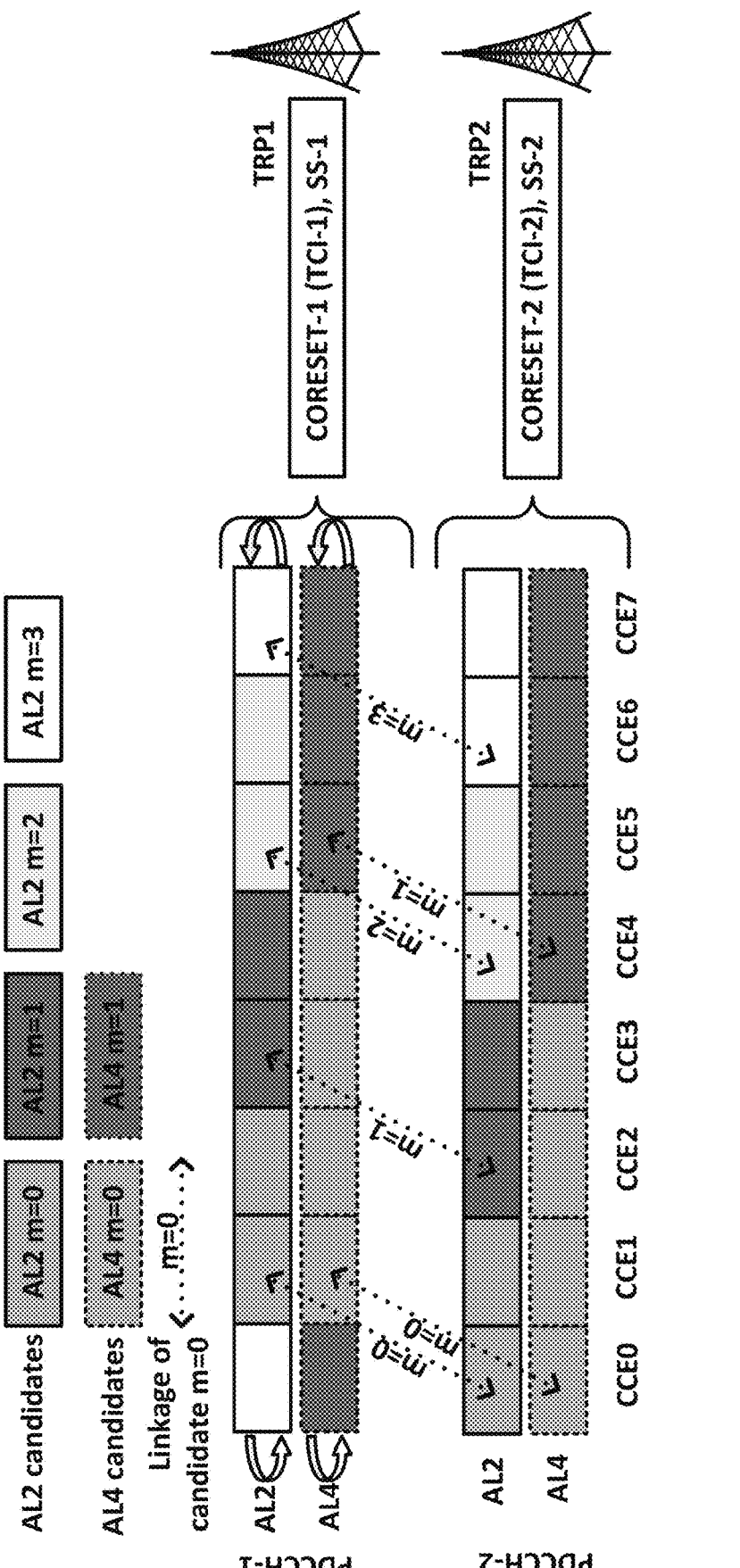
FIG. 1 illustrates an example of physical downlink control channel (PDCCH) repetition for multi-transmission reception point (TRP) operation with synchronization signal (SS) set linking in 3GPP Rel-17.
Figure 2:
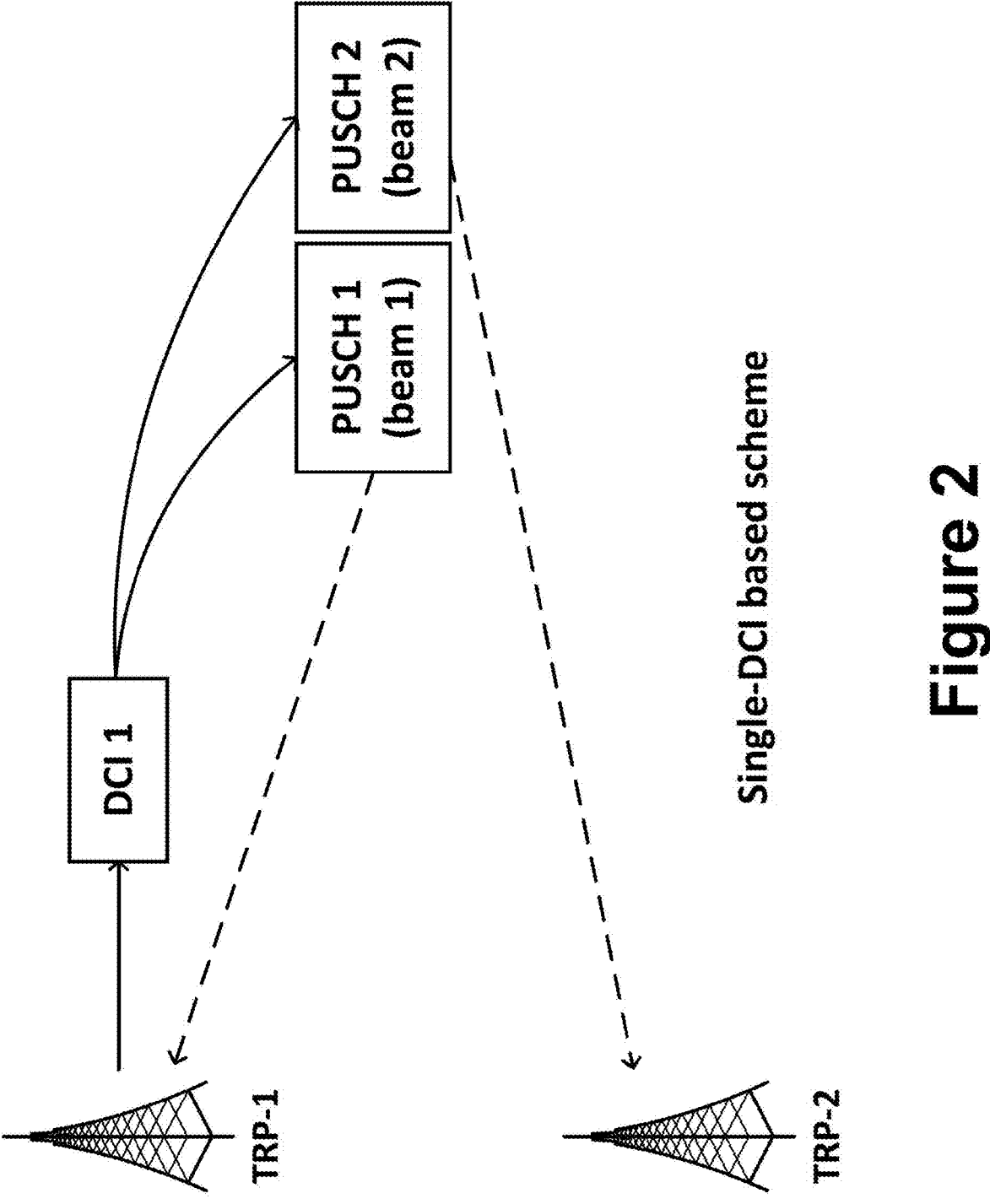
FIG. 2 illustrates an example of physical uplink shared channel (PUSCH) repetition for multi-TRP operation in Rel-17.
Figure 3:
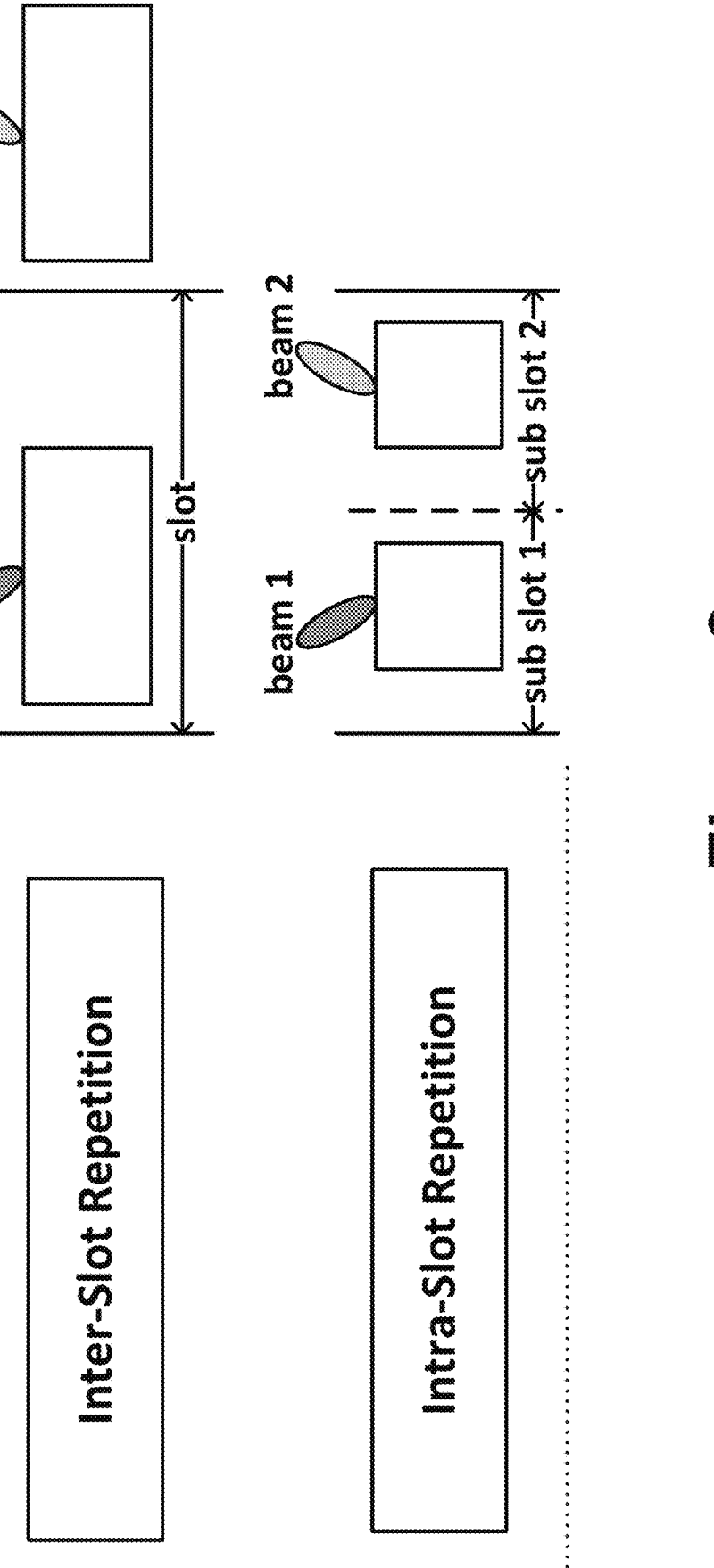
FIG. 3 illustrates an example of physical uplink control channel (PUCCH) repetition schemes for multi-TRP operation in Rel-17.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for a unified transmission configuration indicator (TCI) framework for multi- transmission-reception point (TRP) operation in a wireless cellular network. For example, embodiments may relate to use of a joint TCI codepoint to indicate one or more TCI states (e.g., a joint uplink (UL)/downlink (DL) TCI state, a UL TCI state, and/or a DL TCI state). The techniques may be used for multi—downlink control information (DCI) multi-TRP operation and/or single-DCI multi-TRP operation. Embodiments further relate to techniques for transmission repetition and uplink power control.

In Rel-17 NR, a new unified TCI framework was specified for common beam operation in both downlink and uplink through the mean for joint DL/UL TCI states when the same beam is used in the DL/UL with full beam correspondence and with separate DL and UL TCI (replacing the uplink spatial relation information framework) for the case of no beam correspondence where a separate DL and UL beam are used. However, the Rel-17 unified TCI framework was supported for only single TRP operation.

Various embodiments herein provide a unified TCI framework for multi-TRP operation. For example, embodiments provide a unified TCI framework for multi-TRP operation with PDSCH, PDCCH, PUSCH and PUCCH repetition schemes as well as NCJT operation. Furthermore, embodiments provide techniques for uplink power control. For example, the uplink power control may leverage the unified TCI framework described herein.

Multi-DCI Based Multi-TRP

For multi-DCI multi-TRP operation for scheduling PDSCH, in the case of joint DL/UL beam indication with the value of unifiedtci-StateType set to "JointULDL", using a TCI state from a pool of joint DL/UL TCI (DLorJointT- CIState), in one embodiment, TCI codepoint mapped to M=1 joint DL/UL TCI state is indicated by the scheduling DCI in the case of more than single active or by MAC-CE in the case of single active TCI state. In case of separate DL/UL TCI operation, each DCI should indicate a TCI codepoint mapped to either a single (M=1) DL TCI state, a single (N=1) UL TCI state or alternatively a codepoint mapped to one DL and one UL TCI state.

In one embodiment, a joint DL/UL or a separate DL and/or UL TCI state may be explicitly or implicitly associated with a TRP. In one example of explicit association, a TCI state may be associated with a TRP-ID. In another example, the TCI states may instead be associated with a value of the CORESETPoolIndex. In one embodiment, a beam indication DCI format 1_1/1_2 without DL assignment may be used to activate two joint TCI states or two DL and two UL TCI states associated with each of the two TRPs. In this case, the ACK for the beam indication DCI is transmitted in a PUCCH which is associated with the first or second joint or UL TCI state. In an alternative, separate DCIs can be used to activate TCI states associated with each TRP and the ACK for the beam indication DCI is transmitted using the UL or joint TCI associated with the TCI codepoint indicated by the beam indication DCI. In one example, the two DCI can be transmitted from two TRPs with different values of CORESETPoolIndex. In another example, the two DCIs can be transmitted from the same TRP but the TCI state association with the TRP IDs determined the TRP for which the indicated TCI states are applied. Once activated, the TCI states corresponding to each TRP are assumed to be applied after a beam application time corresponding to each TRP.

In one embodiment, for separate DL/UL TCI indication, when joint HARQ-ACK feedback is configured for multi-DCI multi-TRP and if the DCI scheduling the PDSCH indicates a TCI codepoint mapped to only DL TCI state, the PUCCH transmission carrying the HARQ-ACK feedback uses the UL TCI state that was active at the time of reception of the beam indication via the scheduling DCI. In one alternative, when joint HARQ-ACK feedback is configured for multi-DCI multi-TRP, the UE does not expect to be indicated with a TCI codepoint which is mapped to only a single DL TCI state e.g., scheduling DCI always indicates a codepoint with one DL and one UL TCI state.

In another embodiment, if separate HARQ-ACK feedback is configured, for separate DL/UL TCI indication, the UE expects to be indicated with a TCI codepoint which is mapped to one DL and UL TCI state.

In one embodiment, a default beam for each CORESET-PoolIndex is applicable after initial access or reconfiguration and before the first slot boundary after beam application time after the UE receives a first beam indication DCI for the corresponding CORESETPoolIndex. Once the UE receives a beam application DCI corresponding to a CORESET-PoolIndex, the indicated beam, once applied is assumed to be active until a different TCI state is indicated either by DCI or MAC-CE.

Single DCI Based Multi-TRP

In one embodiment, when unified TCI framework is used for beam indication for single DCI multi-TRP, for the case when the UE is configured with joint DL/UL beam indication with the value of unifiedtci-StateType set to "JointULDL", using a joint DL/UL TCI state (DLorJointT-CIState), a UE expects to be indicated with a TCI codepoint which is mapped to two joint DL/UL TCI states, one for each TRP. The legacy Rel-16/17 MAC-CE can be used to map the joint DL/UL TCI states to the TCI codepoints. In another embodiment, when configured for separate DL/UL beam indication with the value of unifiedtci-StateType set to "SeparateULDL", the UE expects to be indicated with a TCI codepoint which is mapped to two (M=2) DL TCI states or two (N=2) UL TCI states or two DL+two UL TCI states.

In one embodiment, for single-DCI multi-TRP when 2 CDM groups are indicated using DM-RS antenna port indication tables, for joint DL/UL TCI or separate DL/UL TCI with a TCI codepoint mapped to only DL or only UL TCI states, the first TCI state is associated with the CDM group of the $1^{st}$ DM-RS port, and the second TCI state is associated with the second CDM group. In the case of separate DL/UL TCI with one or more TCI codepoints mapped to two DL+two UL TCI states, the first DL and first UL TCI states are associated with the CDM group of the first indicated DM-RS port and the $2^{nd}$ DL and $2^{nd}$ UL TCI states are associated with the $2^{nd}$ CDM group. UE does not expect to be signaled with DM-RS ports from 3 CDM groups.

PDSCH Repetition Scheme 3 (TDMSchemeA) & Scheme 4 (TDMSchemeB)

In one embodiment, when the time offset between the DCI and the $1^{st}$ PDSCH transmission occasion is below the beam application time (BAT) when the scheduling DCI indicates the beams, and before the UE has received the first beam indication DCI with a TCI codepoint which is mapped to two joint DL/UL TCI states, or 2 DL+2 UL TCI states, two default beams are applied where the default beams for each TRP are determined based on the activated TCI codepoints in the slot with the first PDSCH transmission and the lowest indexed TCI codepoint which is mapped to 2 joint DL/UL or 2 DL+2 UL TCI states is considered to be the default beam. In another embodiment, once the UE receives a first beam indication DCI with a TCI codepoint mapped to two joint DL/UL TCI states, or 2 DL+2 UL TCI states, the indicated TCI states are assumed to be active, at the next slot boundary after the corresponding beam application time has elapsed.

In one embodiment, the beam application time for single-DCI multi-TRP can be configured per CC for all TRPs and is determined based on the smallest SCS among the CCs from the TRPs which apply the indicated beams.

PDCCH Repetition for Multi-TRP

For PDCCH repetition in Rel-17 multi-TRP, a DCI is repeated from two TRPs wherein each repetition is from a SS set linked to CORESET which associated with a TCI state. In FIG. 1, PDCCH-1 and PDCCH-2 are repetitions of the same DCI. Candidate m of SS set-1 is linked with candidate m of SS-set-2 for a given AL, using RRC signaling. In one embodiment, CORESETs in SS-1 and SS-2 are configured by RRC per CORESET not to follow the indicated unified TCI states (joint or DL TCI state) with the value of the field followUnifiedTCIstate set to "disabled". In one example, the joint or DL TCI state associated with each of CORESET-1 and CORESET-2 can be indicated via MAC-CE. In another embodiment, CORESET-1 and CORESET-2 can be configured to apply the indicated joint or DL TCI state(s) only for the case when the indicated TCI codepoint maps to 2 joint or DL TCI states. The first TCI state in the codepoint applies to CORESET-1 and second TCI state in the codepoint maps to CORESET-2.

PUSCH Repetition for Multi-TRP

For Rel-17 PUSCH repetition scheme for multi-TRP operation, only single DCI multi-TRP is supported. In one embodiment, an uplink DCI format 0_1 or 0_2 used for scheduling the PUSCH repetitions can be used to indicate a TCI codepoint mapped to two joint DL/UL TCI states or two UL TCI states. In one example, the TCI indication via the uplink DCI is performed by adding a new TCI field in the uplink DCI formats. In another example, the TCI indication in uplink DCI format can be performed by repurposing an existing field in the uplink DCI. In one example, the existing field can be the SRI field. In another embodiment, the beam indication for PUSCH repetition can be performed using a downlink DCI format 1_1 or 1_2 with or without DL scheduling assignment, where the TCI in DCI field indicates a TCI codepoint mapped to two joint or UL TCI states. In the above embodiments, both cyclic and sequential beam mapping can be supported. In one example, for the above beam indication for unified TCI with cyclic beam mapping, the first TCI state mapped to the TCI codepoint corresponds the first PDSCH repetition and the second TCI state corresponds to the second PDSCH repetition and the assignment repeats. Alternately for sequential beam mapping, the first TCI state corresponds first two repetitions of PUSCH and the second TCI state corresponds to the next two repetitions of the PUSCH and this assignment repeats.

PUCCH Repetition for Multi-TRP

In Rel-17 multi-TRP, PUCCH repetition schemes were specified with both intra and inter slot repetition. In one embodiment, when unified TCI framework is used to support PUCCH repetitions, PUCCH resources or resource sets can be configured to follow the indicated Rel-17 joint or UL TCI state and a beam indication DCI with format 1_1/1_2 (with and without data assignment) or 0_1/0_2 with UL data assignment can indicate a TCI codepoint mapped to two joint or UL TCI states and the first TCI state of the codepoint maps to the first PUCCH repetition and the second TCI state in the codepoint maps to the second PUCCH repetition and this pattern repeats for every subsequent repetition. In one embodiment, the UE may be configured via RRC on a per PUCCH resource or resource set basis to not follow the indicated joint or UL TCI state and a MAC-CE can associate two joint or UL TCI states with each PUCCH resource or resource set. Additionally, MAC-CE based signalling can also be used to associate two joint or UL TCI states with a group of PUCCH resources. In another embodiment, if the PUCCH resource with the lowest ID is activated with two uplink or joint TCI states, the first TCI state or the TCI state with the lower ID, is used as the default beam for PUSCH scheduled by DCI format 0_0.

PUSCH Power Control for Single DCI

In Rel-17, one or two TPC command fields can be included in DCI for single-TRP and multi-TRP PUSCH transmission. In general, the first and second TPC command values are mapped to closed loop indexes l=0 and l=1 respectively. The mapping between closed loop indexes and other power control parameters such as p0, alpha, and path loss reference signal (PL-RS) is according to the RRC parameter 'sri-PUSCH-ClosedLoopIndex' within 'SRI-PUSCH-PowerControl'. In Rel-18, however, the unified TCI framework will be applied, and new RRC configurations, 'DLorJoint-TCIState-r17' and 'UL-TCIState-r17' are added, in which the closed loop indexes, p0, alpha, and PL-RS can be configured, shown as follows.

| Rel-18 Unified TCI Power Control | | |
|---|---|---|
| DLorJoint-TCIState-r17 ::= | SEQUENCE { | |
|     tci-StateUnifiedId-r17 |     TCI-StateId, | |
|     qcl-Type1-r17 |     QCL-Info-r17, | |
|     qcl-Type2-r17 |     QCL-Info-r17 | OPTIONAL, -- Need R |
|     ul-powerControl-r17 |      Uplink-powerControlId-r17 |     OPTIONAL, -- Need R |
|     pathlossReferenceRS-Id-r17 |      PUSCH-PathlossReferenceRS-Id -r17 | |
| OPTIONAL -- Need S | | |
| } | | |
| UL-TCIState-r17 ::= | SEQUENCE { | |
|     UL-TCIState-Id-rl7 |     UL-TCIState-Id-r17, | |
|     servingCellId-r17 |     ServCellIndex-r17 | OPTIONAL, -- Need S |
|     referenceSignal-r17 |     CHOICE { | |
|       ssb-Index-r17 |      SSB-Index-r17, | |
|       csi-RS-Index-r17 |       NZP-CSI-RS-ResourceId-r17, | |
|       srs-r17 |     PUCCH-SRS-r17 | |
|     }, | | |
|     additionalPCI-r17 |     AdditionalPCIIndex-r17 | OPTIONAL, -- Need R |
|     ul-powerControl-r17 |     Uplink-powerControlId-r17 | OPTIONAL, -- Need R |
|     pathlossReferenceRS-Id-r17 |      PUSCH-PathlossReferenceRS-Id-r17 | OPTIONAL -- Need |
| S | | |
| } | | |
| Uplink-powerControl-r17 ::= | SEQUENCE { | |
|     ul-powercontrolId-r17 |     Uplink-powerControlId | OPTIONAL, -- Need R |
|     p0AlphaSetforPUSCH-r17 |     P0AlphaSet-r17 | OPTIONAL, -- Need R |
|     p0AlphaSetforPUCCH-r17 |     P0AlphaSet-r17 | OPTIONAL, -- Need R |
|     p0AlphaSetforSRS-r17 |     P0AlphaSet-r17 | OPTIONAL, -- Need R |
| } | | |
| P0AlphaSet-r17 ::= | SEQUENCE { | |
|   p0-r17 | INTEGER (−16..15) | OPTIONAL, -- Need R |
|   alpha-r17 | Alpha | OPTIONAL, -- Need R |
|   closedLoopIndex-r17 | ENUMERATED { i0, i1 } | |

Thus, the new mapping between TPC fields and closed loop indexes and other power control parameters should be specified for PUSCH. In one embodiment, the Rel-17 TPC command field(s) can be reused for mTRP PUSCH transmission with unified TCI framework, where the closed loop indexes are mapped to p0, alpha, and PL-RS according to the closed loop index value included in the RRC parameter of joint TCI state or UL TCI states, such as the 'closedLoop-Index-r17' included in 'DLorJoint-TCIState-r17' or 'UL-TCIState-r17'. In another embodiment, a joint TPC field for The SRI value is the same with 'sri-PUSCH-PowerControlId' value in 'SRI-PUSCH-PowerControl'. Second, the mapping between SRI and p0 can be based on Rel-17 rules. In another embodiment, map TCI states to the p0 values. For instance, when the TCI field(s) exists, if the OLPC field value is '0', UE determines p0 from a mapping between the indicated TCI state ID and the p0 value in RRC configuration for unified TCI state. And if the TCI field is absent, the TCI state ID(s) is mapped to 'P0-PUSCH-SetId-r16' in 'P0-PUSCH-Set-r16'.

```
SRI-PUSCH-PowerControl ::=          SEQUENCE {
    sri-PUSCH-PowerControlId              SRI-PUSCH-PowerControlId,
    sri-PUSCH-PathlossReferenceRS-Id     PUSCH-PathlossReferenceRS-Id,
    sri-P0-PUSCH-AlphaSetId              P0-PUSCH-AlphaSetId,
    sri-PUSCH-ClosedLoopIndex            ENUMERATED { i0, i1 }
}
``` multi-TRP transmission can be designed, which indicates the TPC command values for both TRPs.

In Rel-17, the PUSCH open loop power control is indicated the DCI field of OLPC. The OLPC field can be 0, 1, or 2 bits. It is 0 bit if the higher layer parameter 'p0-PUSCH-SetList' is not configured. Otherwise, it is 1 bit if the SRI field(s) is present, and it is 1 or 2 bits if the SRI field(s) is absent. The value of OLPC field is mapped to a p0 value in certain RRC parameters for single TRP transmission or mapped to two p0 values in certain RRC parameters for multi-TRP transmission. In Rel-18, unified TCI framework has been involved and corresponding RRC parameters as listed above have been added for power control. Thus new mapping between OLPC field value and p0 value(s) should be designed. In one embodiment, if TCI field(s) exists, the OLPC field value is mapped to p0 value(s) according to the TCI state ID. For example, if the OLPC field value is '0', UE determines p0 from a mapping between the indicated TCI state ID and the 'P0AlphaSet-r17' in 'Uplink-powerControl-r17' in RRC configuration for unified TCI state. And if the TCI field is absent, the mapping between OLPC field value and p0 value(s) can be based on Rel-17 design. In another embodiment, if the TCI field(s) exist and 'SRI-PUSCH-PowerControl' is configured, the TCI state ID(s) is mapped to the 'sri-PUSCH-PowerControlId'. Then the mapping between OLPC field value and p0 is according to Rel-17 rule for SRI field(s) present. For instance, if the OLPC field value is '0', UE determines p0(s) from 'SRI-PUSCH-PowerControl' with a 'sri-PUSCH-PowerControlId' value(s) mapped to the TCI field value. And if the OLPC field value is '1', the UE determines p0(s) from a first value in 'P0-PUSCH-Set' in 'p0-PUSCH-SetList' (and in 'p0-PUSCH-SetList2') with a 'p0-PUSCH-SetId' value(s) mapped to the TPC field value. In another embodiment, a two-step mapping is applied. First, mapping between TCI state IDs and SRI can be provided in RRC configuration or an activation MAC CE.

Figure 4:
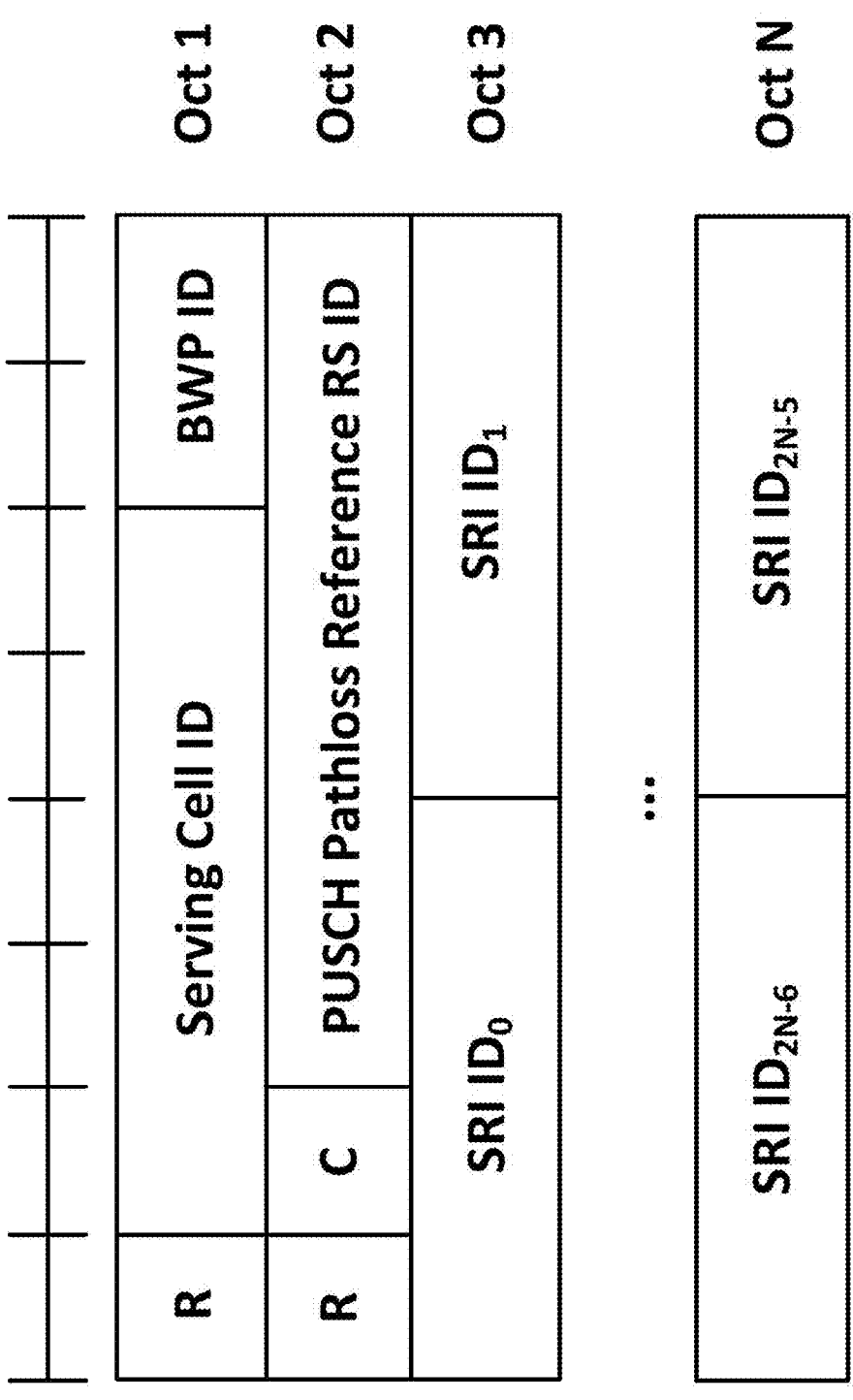
FIG. 4 illustrates an example of a Rel-17 PUSCH path loss reference signal (PL-RS) update medium access control (MAC) control element (CE).
Figure 5:
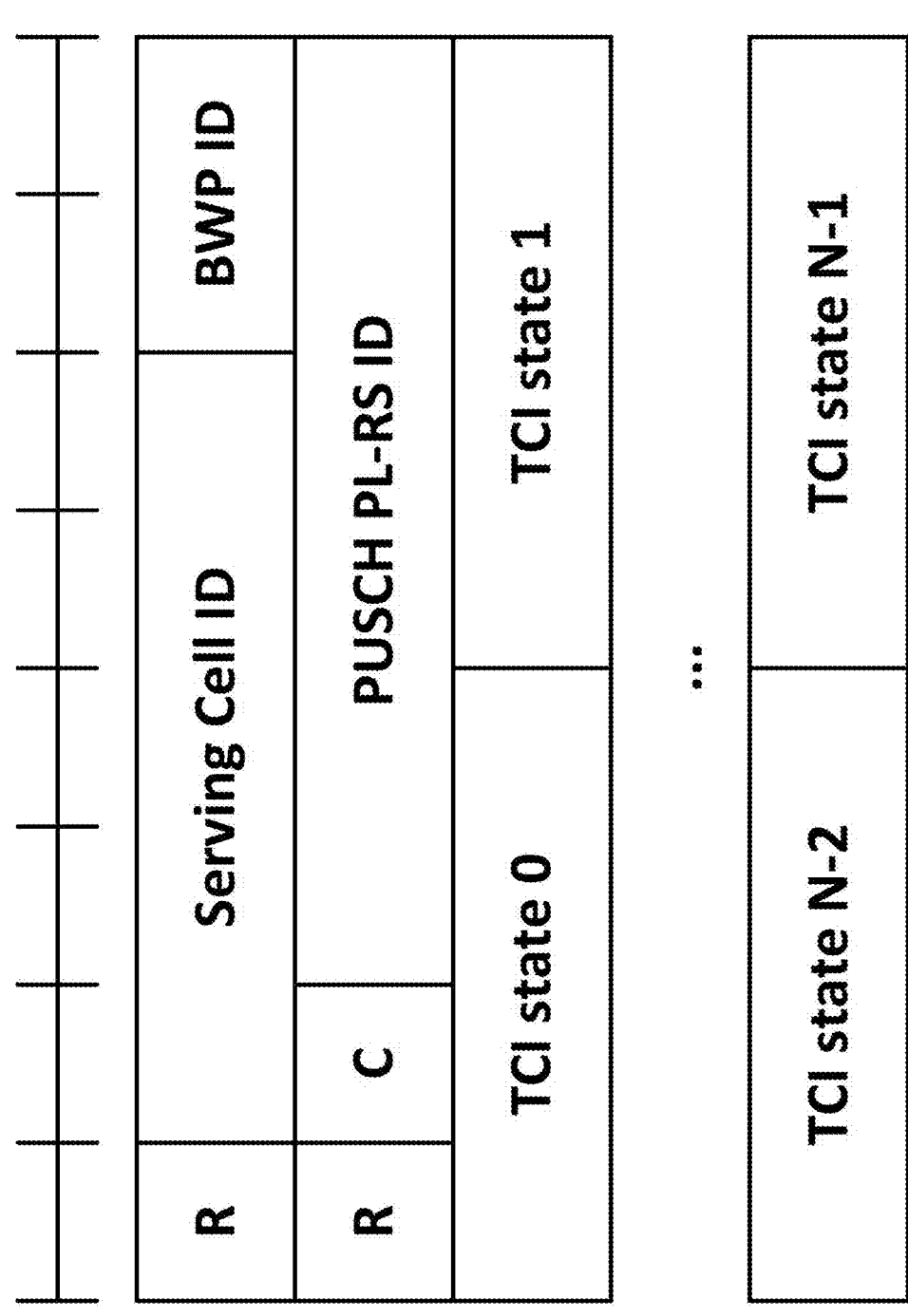
FIG. 5 illustrates an example of a TCI-based PUSCH PL-RS update MAC CE, in accordance with various embodiments.

In Rel-17, the PL-RS is mapped to an SRI and the default PL-RS is determined based on whether 'enablePL-RS-UpdateForPUSCH-SRS' is provided to the UE. And if the UE is provided 'enablePL-RS-UpdateForPUSCH-SRS', a mapping between 'sri-PUSCH-PowerControlId' and 'PUSCH-PathlossReferenceRS-Id' values can be updated by a MAC CE as shown in FIGXX. In Rel-18 unified TCI framework, the SRI field may not exist and the RL-RS can be mapped to TCI states. A similar MAC CE based PL-RS update should be supported. In one embodiment, a two-step mapping is applied. First, mapping between TCI state IDs and SRI IDs can be provided in RRC configuration or an activation MAC CE. Second, if the UE is provided 'enablePL-RS-UpdateForPUSCH-SRS', a mapping between SRI ID and 'PUSCH-PathlossReferenceRS-Id' values can be updated by a current Rel-17 MAC CE, as shown FIG. 4. In another embodiment, a one-step mapping is applied, and a new RRC parameter 'enablePL-RS-Update-ForPUSCH-TCI' can be configured. If the UE is provided 'enablePL-RS-UpdateForPUSCH-TCI', a mapping between TCI state ID and 'PUSCH-PathlossReferenceRS-Id' values can be updated by a MAC CE, as shown in FIG. 5.

PUCCH Power Control for Single DCI

Figure 6:
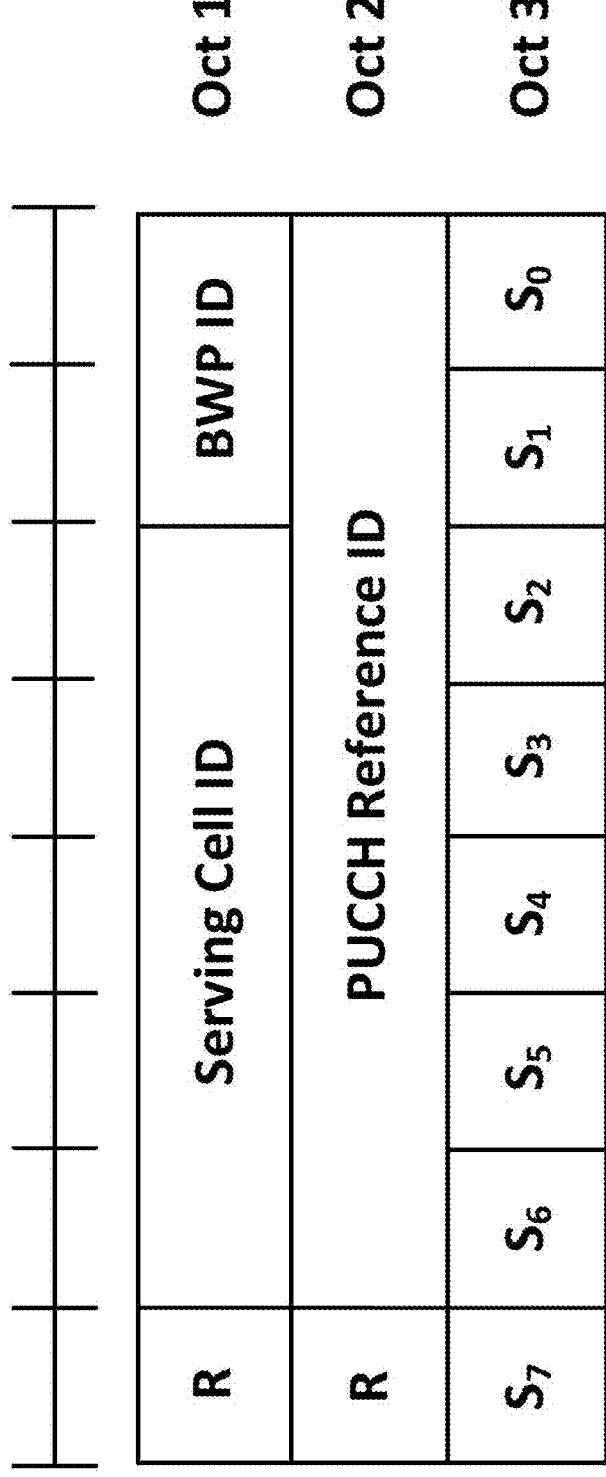
FIG. 6 illustrates an example of a PUCCH spatial relation activation/deactivation MAC CE, in accordance with various embodiments.

In Rel-17, one or two TPC command fields can be included in DCI for single-TRP and multi-TRP PUSCH transmission. In general, the first and second TPC command values are mapped to closed loop index $l=0$ and $l=1$ respectively. The mapping between closed loop indexes and other power control parameters such as p0, alpha, and PL-RS is according to the MAC CE activation and RRC configuration. To be specific, the MAC CE, as shown in FIG. 6, can activate/deactivate the spatial relation info ID associated with the PUCCH resource ID. And the spatial relation info ID is associated with closed loop index, p0, and PL-RS in the RRC parameter 'PUCCH-SpatialRelationInfo' as follows.

| Rel-17 PUCCH Spatial Relation Info |
|---|

```
PUCCH-SpatialRelationInfo ::=          SEQUENCE {
   pucch-SpatialRelationInfoId            PUCCH-SpatialRelationInfoId,
   servingCellId               ServCellIndex   OPTIONAL, -- Need S
   referenceSignal                        CHOICE {
      ssb-Index                           SSB-Index,
      csi-RS-Index                          NZP-CSI-RS-ResourceId,
      srs                     PUCCH-SRS
   },
   pucch-PathlossReferenceRS-Id               PUCCH-PathlossReferenceRS-Id,
   p0-PUCCH-Id                 P0-PUCCH-Id,
   closedLoopIndex             ENUMERATED { i0, i1 }
}
```

In Rel-18, however, the unified TCI framework will be applied, and new RRC configurations, 'DLorJoint-TCIState-r17' and 'UL-TCIState-r17' are added, in which the closed loop indexes, p0, alpha, and PL-RS can be configured.

Thus, the new mapping between TPC fields and closed loop indexes and other power control parameters should be specified for PUCCH. In one embodiment, the Rel-17 TPC command field(s) can be reused for mTRP PUCCH transmission with unified TCI framework, where the closed loop indexes are mapped to p0 and PL-RS according to the closed loop index value included in the RRC parameter of joint TCI state or UL TCI states, such as the 'closedLoopIndex-r17' included in 'DLorJoint-TCIState-r17' or 'UL-TCIState-r17'. In another embodiment, a joint TPC field for multi-TRP transmission can be designed, which indicates the TPC command values for both TRPs. In another embodiment, the 'S' field of PUCCH spatial relation activation/deactivation MAC CE can be reinterpreted as TCI state ID. One or two TCI states can be activated/deactivated with this MAC CE. And the TCI state ID is mapped to RRC parameter 'Uplink-powerControl-r17' which configures p0, alpha, and closed loop index. In another embodiment, a two-step mapping is applied. First, mapping between TCI state IDs and SRI IDs can be provided in RRC configuration or an activation MAC CE. Second, once the MAC CE activates/deactivates a certain PUCCH spatial relation(s) for the PUCCH resource, the PUCCH spatial relation(s) is mapped to TCI state ID(s) according to the configuration or indication in the first step. In another embodiment, new MAC CE activation of TCI states for a PUCCH resource can be designed, as shown in FIG. 7, where the Ti field represents the (i+1)-th TCI state ID.

Systems and Implementations

Figure 8:
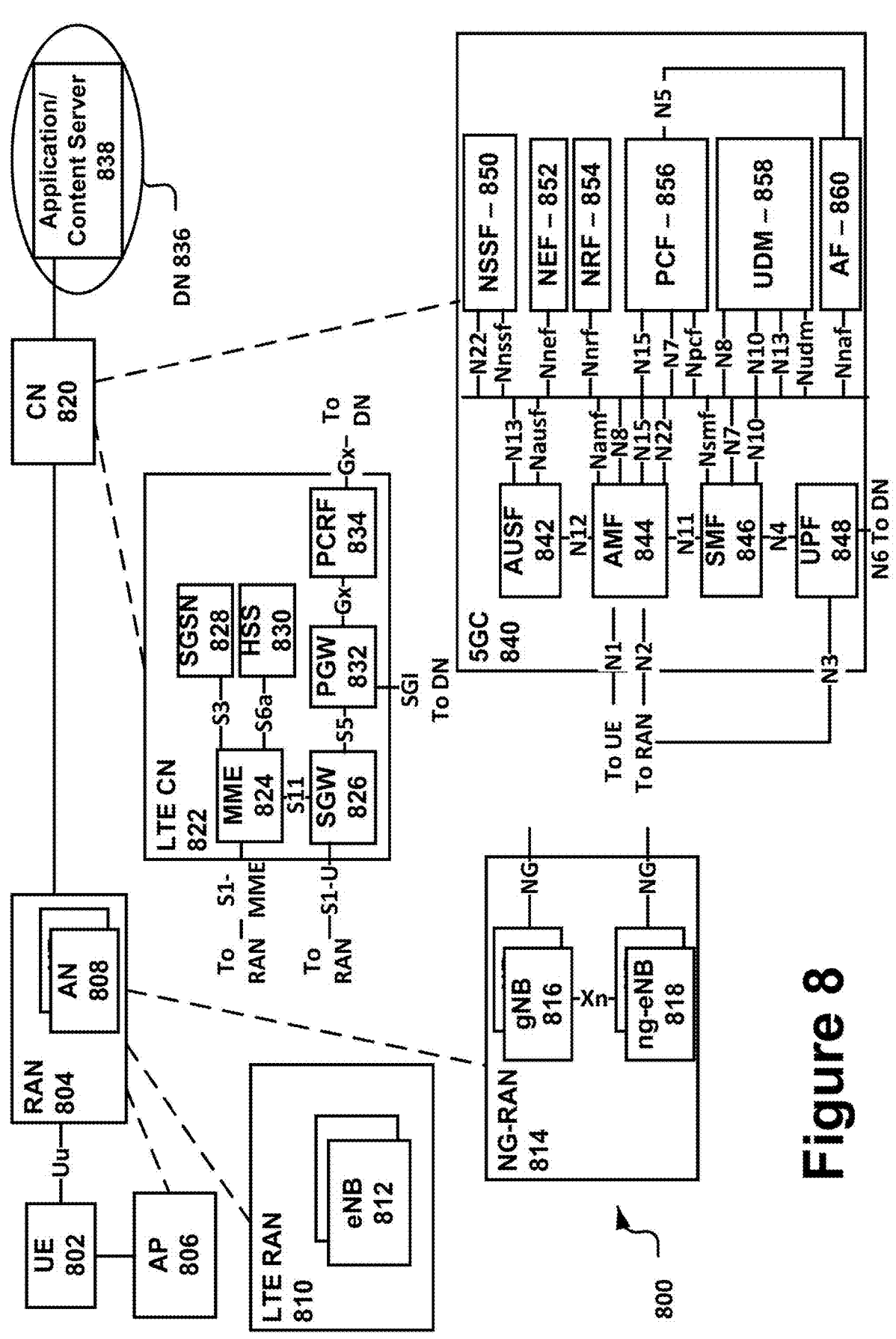
FIG. 8 schematically illustrates a wireless network in accordance with various embodiments.
Figure 9:
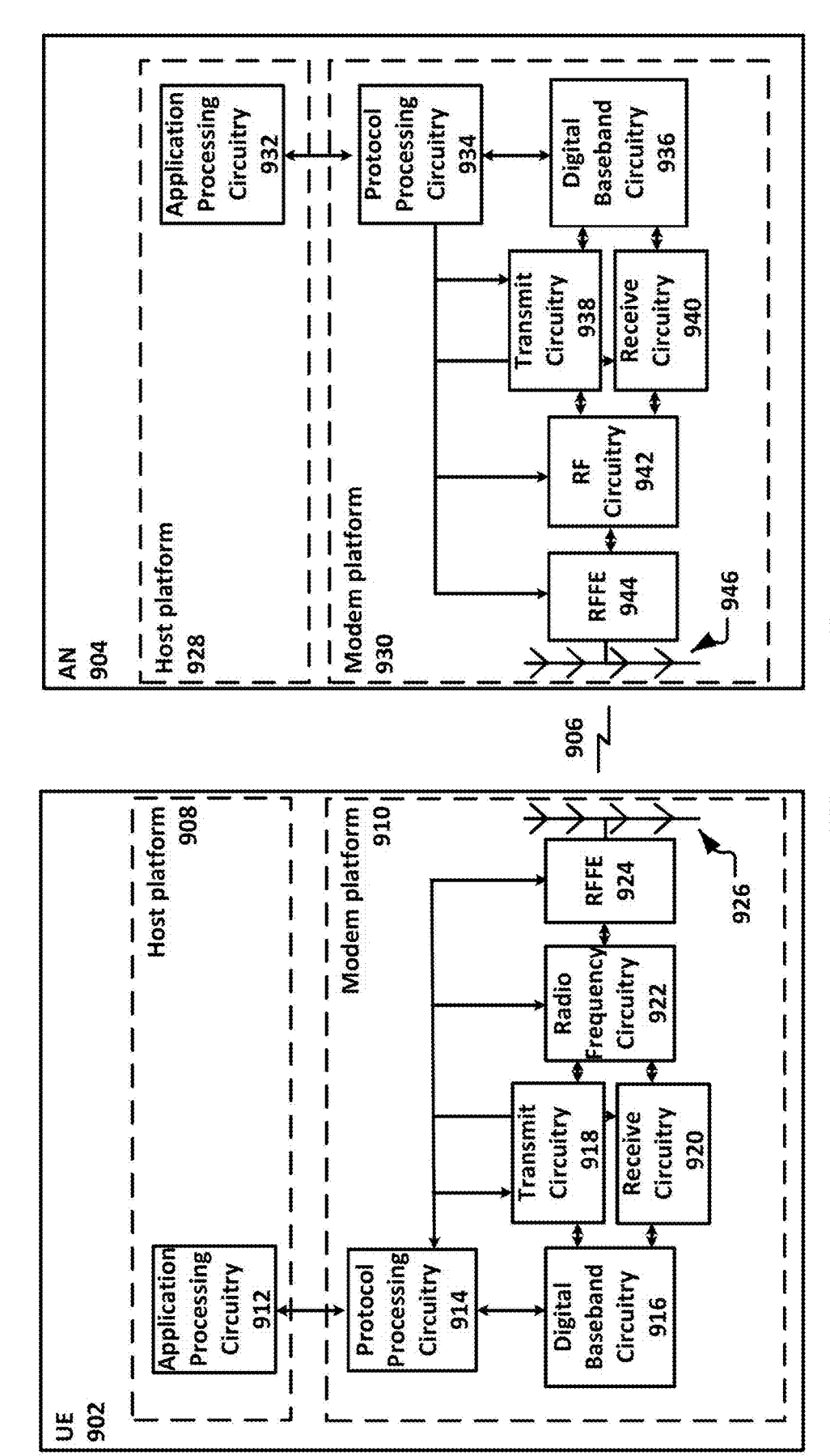
FIG. 9 schematically illustrates components of a wireless network in accordance with various embodiments.
Figure 10:
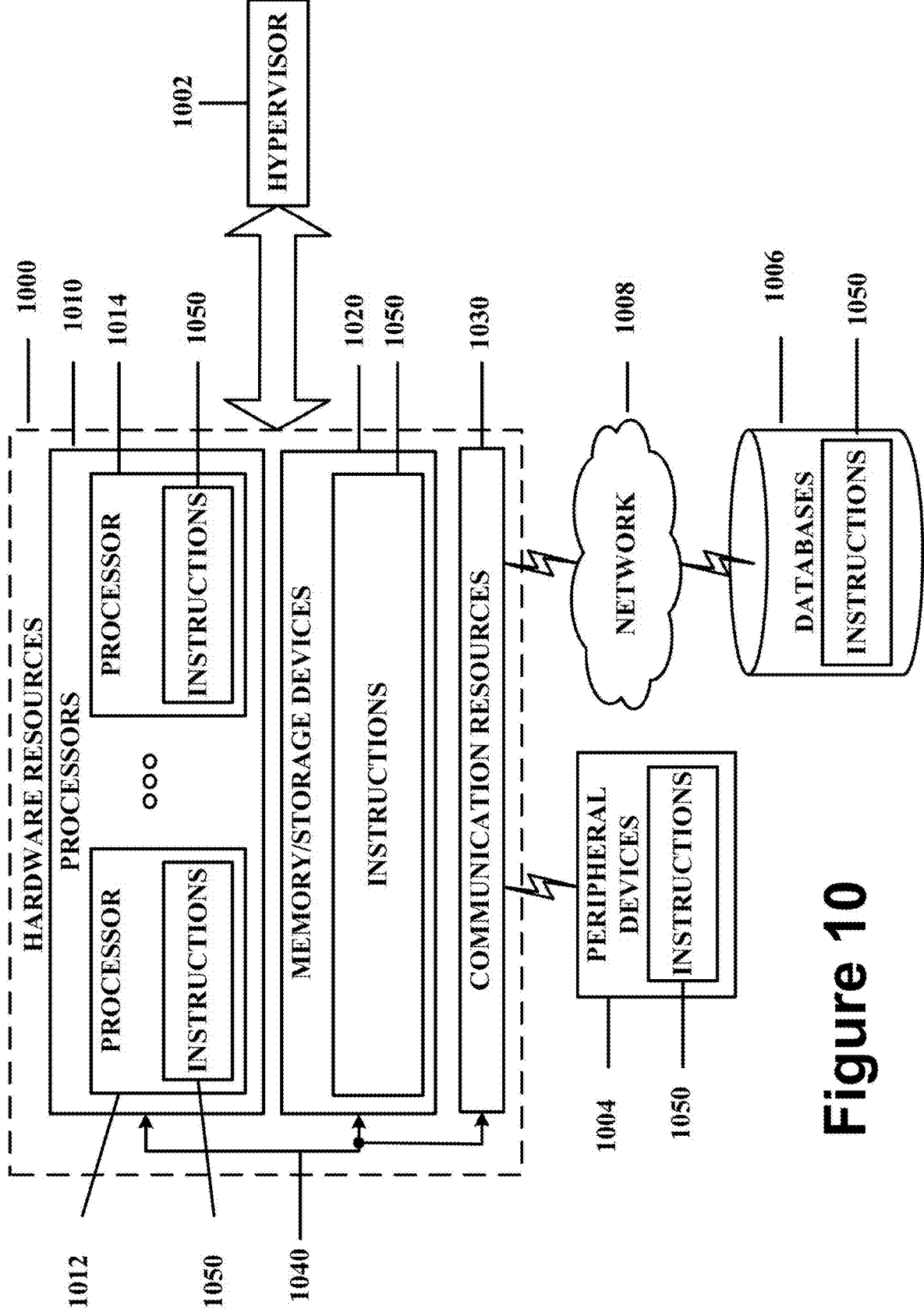
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 8-10 illustrate various systems, devices, and components that may implement aspects of disclosed embodiments.

FIG. 8 illustrates a network 800 in accordance with various embodiments. The network 800 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 800 may include a UE 802, which may include any mobile or non-mobile computing device designed to communicate with a RAN 804 via an over-the-air connection. The UE 802 may be communicatively coupled with the RAN 804 by a Uu interface. The UE 802 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 800 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 802 may additionally communicate with an AP 806 via an over-the-air connection. The AP 806 may manage a WLAN connection, which may serve to offload some/all network traffic from the RAN 804. The connection between the UE 802 and the AP 806 may be consistent with any IEEE 802.11 protocol, wherein the AP 806 could be a wireless fidelity (Wi-Fi®) router. In some embodiments, the UE 802, RAN 804, and AP 806 may utilize cellular-WLAN aggregation (for example, LWA/LWIP). Cellular-WLAN aggregation may involve the UE 802 being configured by the RAN 804 to utilize both cellular radio resources and WLAN resources.

The RAN 804 may include one or more access nodes, for example, AN 808. AN 808 may terminate air-interface protocols for the UE 802 by providing access stratum protocols including RRC, PDCP, RLC, MAC, and L1 protocols. In this manner, the AN 808 may enable data/voice connectivity between CN 820 and the UE 802. In some embodiments, the AN 808 may be implemented in a discrete device or as one or more software entities running on server computers as part of, for example, a virtual network, which may be referred to as a CRAN or virtual baseband unit pool. The AN 808 be referred to as a BS, gNB, RAN node, eNB, ng-eNB, NodeB, RSU, TRxP, TRP, etc. The AN 808 may be a macrocell base station or a low power base station for providing femtocells, picocells or other like cells having smaller coverage areas, smaller user capacity, or higher bandwidth compared to macrocells.

In embodiments in which the RAN 804 includes a plurality of ANs, they may be coupled with one another via an X2 interface (if the RAN 804 is an LTE RAN) or an Xn interface (if the RAN 804 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 804 may each manage one or more cells, cell groups, component carriers, etc. to provide the UE 802 with an air interface for network access. The UE 802 may be simultaneously connected with a plurality of cells provided by the same or different ANs of the RAN 804. For example, the UE 802 and RAN 804 may use carrier aggregation to allow the UE 802 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 804 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 802 or AN 808 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/ software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 804 may be an LTE RAN 810 with eNBs, for example, eNB 812. The LTE RAN 810 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 804 may be an NG-RAN 814 with gNBs, for example, gNB 816, or ng-eNBs, for example, ng-eNB 818. The gNB 816 may connect with 5G-enabled UEs using a 5G NR interface. The gNB 816 may connect with a 5G core through an NG interface, which may include an N2 interface or an N3 interface. The ng-eNB 818 may also connect with the 5G core through an NG interface, but may connect with a UE via an LTE air interface. The gNB 816 and the ng-eNB 818 may connect with each other over an Xn interface.

In some embodiments, the NG interface may be split into two parts, an NG user plane (NG-U) interface, which carries traffic data between the nodes of the NG-RAN 814 and a UPF 848 (e.g., N3 interface), and an NG control plane (NG-C) interface, which is a signaling interface between the nodes of the NG-RAN 814 and an AMF 844 (e.g., N2 interface).

The NG-RAN 814 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 802 can be configured with multiple BWPs where each BWP configuration has a different SCS. When a BWP change is indicated to the UE 802, the SCS of the transmission is changed as well. Another use case example of BWP is related to power saving. In particular, multiple BWPs can be configured for the UE 802 with different amount of frequency resources (for example, PRBs) to support data transmission under different traffic loading scenarios. A BWP containing a smaller number of PRBs can be used for data transmission with small traffic load while allowing power saving at the UE 802 and in some cases at the gNB 816. A BWP containing a larger number of PRB s can be used for scenarios with higher traffic load.

The RAN 804 is communicatively coupled to CN 820 that includes network elements to provide various functions to support data and telecommunications services to customers/ subscribers (for example, users of UE 802). The components of the CN 820 may be implemented in one physical node or separate physical nodes. In some embodiments, NFV may be utilized to virtualize any or all of the functions provided by the network elements of the CN 820 onto physical compute/storage resources in servers, switches, etc. A logical instantiation of the CN 820 may be referred to as a network slice, and a logical instantiation of a portion of the CN 820 may be referred to as a network sub-slice.

In some embodiments, the CN 820 may be an LTE CN 822, which may also be referred to as an EPC. The LTE CN 822 may include MME 824, SGW 826, SGSN 828, HSS 830, PGW 832, and PCRF 834 coupled with one another over interfaces (or "reference points") as shown. Functions of the elements of the LTE CN 822 may be briefly introduced as follows.

The MME 824 may implement mobility management functions to track a current location of the UE 802 to facilitate paging, bearer activation/deactivation, handovers, gateway selection, authentication, etc.

The SGW 826 may terminate an S1 interface toward the RAN and route data packets between the RAN and the LTE CN 822. The SGW 826 may be a local mobility anchor point for inter-RAN node handovers and also may provide an anchor for inter-3GPP mobility. Other responsibilities may include lawful intercept, charging, and some policy enforcement.

The SGSN 828 may track a location of the UE 802 and perform security functions and access control. In addition, the SGSN 828 may perform inter-EPC node signaling for mobility between different RAT networks; PDN and S-GW selection as specified by MME 824; MME selection for handovers; etc. The S3 reference point between the MME 824 and the SGSN 828 may enable user and bearer information exchange for inter-3GPP access network mobility in idle/active states.

The HSS 830 may include a database for network users, including subscription-related information to support the network entities' handling of communication sessions. The HSS 830 can provide support for routing/roaming, authentication, authorization, naming/addressing resolution, location dependencies, etc. An S6a reference point between the HSS 830 and the MME 824 may enable transfer of subscription and authentication data for authenticating/authorizing user access to the LTE CN 820.

The PGW 832 may terminate an SGi interface toward a data network (DN) 836 that may include an application/content server 838. The PGW 832 may route data packets between the LTE CN 822 and the data network 836. The PGW 832 may be coupled with the SGW 826 by an S5 reference point to facilitate user plane tunneling and tunnel management. The PGW 832 may further include a node for policy enforcement and charging data collection (for example, PCEF). Additionally, the SGi reference point between the PGW 832 and the data network 836 may be an operator external public, a private PDN, or an intra-operator packet data network, for example, for provision of IMS services. The PGW 832 may be coupled with a PCRF 834 via a Gx reference point.

The PCRF 834 is the policy and charging control element of the LTE CN 822. The PCRF 834 may be communicatively coupled to the app/content server 838 to determine appropriate QoS and charging parameters for service flows. The PCRF 832 may provision associated rules into a PCEF (via Gx reference point) with appropriate TFT and QCI.

In some embodiments, the CN 820 may be a 5GC 840. The 5GC 840 may include an AUSF 842, AMF 844, SMF 846, UPF 848, NSSF 850, NEF 852, NRF 854, PCF 856, UDM 858, and AF 860 coupled with one another over interfaces (or "reference points") as shown. Functions of the elements of the 5GC 840 may be briefly introduced as follows.

The AUSF 842 may store data for authentication of UE 802 and handle authentication-related functionality. The AUSF 842 may facilitate a common authentication framework for various access types. In addition to communicating with other elements of the 5GC 840 over reference points as shown, the AUSF 842 may exhibit an Nausf service-based interface.

The AMF 844 may allow other functions of the 5GC 840 to communicate with the UE 802 and the RAN 804 and to subscribe to notifications about mobility events with respect to the UE 802. The AMF 844 may be responsible for registration management (for example, for registering UE 802), connection management, reachability management, mobility management, lawful interception of AMF-related events, and access authentication and authorization. The AMF 844 may provide transport for SM messages between the UE 802 and the SMF 846, and act as a transparent proxy for routing SM messages. AMF 844 may also provide transport for SMS messages between UE 802 and an SMSF. AMF 844 may interact with the AUSF 842 and the UE 802 to perform various security anchor and context management functions. Furthermore, AMF 844 may be a termination point of a RAN CP interface, which may include or be an N2 reference point between the RAN 804 and the AMF 844; and the AMF 844 may be a termination point of NAS (N1) signaling, and perform NAS ciphering and integrity protection. AMF 844 may also support NAS signaling with the UE 802 over an N3 IWF interface.

The SMF 846 may be responsible for SM (for example, session establishment, tunnel management between UPF 848 and AN 808); UE IP address allocation and management (including optional authorization); selection and control of UP function; configuring traffic steering at UPF 848 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 844 over N2 to AN 808; and determining SSC mode of a session. SM may refer to management of a PDU session, and a PDU session or "session" may refer to a PDU connectivity service that provides or enables the exchange of PDUs between the UE 802 and the data network 836.

The UPF 848 may act as an anchor point for intra-RAT and inter-RAT mobility, an external PDU session point of interconnect to data network 836, and a branching point to support multi-homed PDU session. The UPF 848 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 848 may include an uplink classifier to support routing traffic flows to a data network.

The NSSF 850 may select a set of network slice instances serving the UE 802. The NSSF 850 may also determine allowed NSSAI and the mapping to the subscribed S-NS-SAIs, if needed. The NSSF 850 may also determine the AMF set to be used to serve the UE 802, or a list of candidate AMFs based on a suitable configuration and possibly by querying the NRF 854. The selection of a set of network slice instances for the UE 802 may be triggered by the AMF 844 with which the UE 802 is registered by interacting with the NSSF 850, which may lead to a change of AMF. The NSSF 850 may interact with the AMF 844 via an N22 reference point; and may communicate with another NSSF in a visited network via an N31 reference point (not shown). Additionally, the NSSF 850 may exhibit an Nnssf service-based interface.

The NEF 852 may securely expose services and capabilities provided by 3GPP network functions for third party, internal exposure/re-exposure, AFs (e.g., AF 860), edge computing or fog computing systems, etc. In such embodiments, the NEF 852 may authenticate, authorize, or throttle the AFs. NEF 852 may also translate information exchanged with the AF 860 and information exchanged with internal network functions. For example, the NEF 852 may translate between an AF-Service-Identifier and an internal 5GC information. NEF 852 may also receive information from other NFs based on exposed capabilities of other NFs. This information may be stored at the NEF 852 as structured data, or at a data storage NF using standardized interfaces. The stored information can then be re-exposed by the NEF 852 to other NFs and AFs, or used for other purposes such as analytics. Additionally, the NEF 852 may exhibit an Nnef service-based interface.

The NRF 854 may support service discovery functions, receive NF discovery requests from NF instances, and provide the information of the discovered NF instances to the NF instances. NRF 854 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 854 may exhibit the Nnrf service-based interface.

The PCF 856 may provide policy rules to control plane functions to enforce them, and may also support unified policy framework to govern network behavior. The PCF 856 may also implement a front end to access subscription information relevant for policy decisions in a UDR of the UDM 858. In addition to communicating with functions over reference points as shown, the PCF 856 exhibit an Npcf service-based interface.

The UDM 858 may handle subscription-related information to support the network entities' handling of communication sessions, and may store subscription data of UE 802. For example, subscription data may be communicated via an N8 reference point between the UDM 858 and the AMF 844. The UDM 858 may include two parts, an application front end and a UDR. The UDR may store subscription data and policy data for the UDM 858 and the PCF 856, and/or structured data for exposure and application data (including PFDs for application detection, application request information for multiple UEs 802) for the NEF 852. The Nudr service-based interface may be exhibited by the UDR 221 to allow the UDM 858, PCF 856, and NEF 852 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 858 may exhibit the Nudm service-based interface.

The AF 860 may provide application influence on traffic routing, provide access to NEF, and interact with the policy framework for policy control.

In some embodiments, the 5GC 840 may enable edge computing by selecting operator/3rd party services to be geographically close to a point that the UE 802 is attached to the network. This may reduce latency and load on the network. To provide edge-computing implementations, the 5GC 840 may select a UPF 848 close to the UE 802 and execute traffic steering from the UPF 848 to data network 836 via the N6 interface. This may be based on the UE subscription data, UE location, and information provided by the AF 860. In this way, the AF 860 may influence UPF (re)selection and traffic routing. Based on operator deployment, when AF 860 is considered to be a trusted entity, the network operator may permit AF 860 to interact directly with relevant NFs. Additionally, the AF 860 may exhibit an Naf service-based interface.

The data network 836 may represent various network operator services, Internet access, or third party services that may be provided by one or more servers including, for example, application/content server 838.

FIG. 9 schematically illustrates a wireless network 900 in accordance with various embodiments. The wireless network 900 may include a UE 902 in wireless communication with an AN 904. The UE 902 and AN 904 may be similar to, and substantially interchangeable with, like-named components described elsewhere herein.

The UE 902 may be communicatively coupled with the AN 904 via connection 906. The connection 906 is illustrated as an air interface to enable communicative coupling, and can be consistent with cellular communications protocols such as an LTE protocol or a 5G NR protocol operating at mmWave or sub-6 GHz frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, IP) operations The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 918, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 946. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040 or other interface circuitry. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processors 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface controllers, components, or other suitable devices to communicate with one or more peripheral devices 1004 or one or more databases 1006 or other network elements via a network 1008. For example, the communication resources 1030 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Example Procedures

In some embodiments, the electronic device(s), network(s), system(s), chip(s) or component(s), or portions or implementations thereof, of FIGS. 8-10, or some other figure herein, may be configured to perform one or more processes, techniques, or methods as described herein, or portions thereof. For example, FIG. 11 illustrates a process 1100 in accordance with various embodiments. The process 1100 may be performed by a UE or a portion thereof. At 1102, the process 1100 may include receiving a downlink control information (DCI) that includes a joint codepoint to indicate one or more first transmission configuration indicator (TCI) states for a first transmission-reception point (TRP) and one or more second TCI states for a second TRP. At 1104, the process 1100 may further include receiving a first downlink (DL) transmission from the first TRP or transmit a first uplink transmission to the first TRP based on the one or more first TCI states. At 1106, the process 1100 may further include receiving a second DL transmission from the second TRP or transmit a second uplink transmission to the second TRP based on the one or more second TCI states.

FIG. 12 illustrates another example process 1200 in accordance with various embodiments. The process 1200 may be performed by a UE or a portion thereof. At 1202, the process 1200 may include receiving a first transmission configuration indicator (TCI) codepoint to indicate one or more first transmission configuration indicator (TCI) states for a first transmission-reception point (TRP), and a second TCI codepoint to indicate one or more second TCI states for a second TRP for multi-downlink control information (DCI) multi-TRP communication. At 1204, the process 1200 may further include performing the multi-TRP communication based on the indicated one or more first TCI states and one or more second TCI states.

FIG. 13 illustrates another example process 1300 in accordance with various embodiments. In some embodiments, the process 1300 may be performed by a gNB, a TRP, and/or a portion thereof. For example, a gNB that implements one or more TRPs may perform the process 1300. At 1302, the process 1300 may include encoding, for transmission to a user equipment (UE), a downlink control information (DCI) that includes a joint codepoint to indicate one or more first transmission configuration indicator (TCI) states for a first transmission-reception point (TRP) and one or more second TCI states for a second TRP. At 1304, the process 1300 may further include transmitting a first downlink (DL) transmission via the first TRP or receive a first uplink (UL) transmission via the first TRP based on the one or more first TCI states.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Some non-limiting examples of various embodiments are provided below.

Example A1 may include One or more non-transitory computer-readable media (NTCRM) having instructions, stored thereon, that when executed by one or more processors of a user equipment (UE) configure the UE to: receive a downlink control information (DCI) that includes a joint codepoint to indicate one or more first transmission configuration indicator (TCI) states for a first transmission-reception point (TRP) and one or more second TCI states for a second TRP; receive a first downlink (DL) transmission from the first TRP or transmit a first uplink (UL) transmission to the first TRP based on the one or more first TCI states; and receive a second DL transmission from the second TRP or transmit a second uplink transmission to the second TRP based on the one or more second TCI states.

Example A2 may include the one or more NTCRM of example A1, wherein the one or more first TCI states include a joint UL/DL TCI state, or one or both of a separate UL TCI state or a separate DL TCI state for the first TRP.

Example A3 may include the one or more NTCRM of example A2, wherein the DCI further includes a unified TCI state type field to indicate whether the joint codepoint is to indicate the joint UL-DL TCI state or the one or both of the separate UL TCI state or the separate DL TCI state.

Example A4 may include the one or more NTCRM of example A1, wherein the joint codepoint is a first joint codepoint, and wherein the instructions, when executed, are further to configure the UE to receive a medium access control (MAC) control element (CE) to map a plurality of joint codepoints, including the first joint codepoint, to respective sets of TCI state information.

Example A5 may include the one or more NTCRM of example A1, wherein the DCI schedules the first DL transmission or the first UL transmission and the second DL transmission or the second UL transmission.

Example A6 may include the one or more NTCRM of example A1, wherein the indicated one or more first TCI states and one or more second TCI states are active at a next slot boundary after a beam application time has elapsed based on the receipt of the DCI.

Example A7 may include the one or more NTCRM of example A1, wherein the DCI includes an open loop power control (OLPC) field, and wherein the instructions when executed, further configure the UE to: identify one or more p0 values for open loop power control that are mapped from a value of the OLPC field according to a TCI state ID associated with the joint codepoint.

Example A8 may include the one or more NTCRM of example A1, wherein the instructions, when executed, further configure the UE to: map the one or more first TCI states to one or more p0 values; and transmit the first uplink transmission using open loop power control based on the one or more p0 values.

Example A9 may include one or more non-transitory computer-readable media (NTCRM) having instructions, stored thereon, that when executed by one or more processors of a user equipment (UE) configure the UE to: receive a first transmission configuration indicator (TCI) codepoint to indicate one or more first transmission configuration indicator (TCI) states for a first transmission-reception point (TRP), and a second TCI codepoint to indicate one or more second TCI states for a second TRP for multi-downlink control information (DCI) multi-TRP communication; and perform the multi-TRP communication based on the indicated one or more first TCI states and one or more second TCI states.

Example A10 may include the one or more NTCRM of example A9, wherein the first TCI codepoint is indicated by a first control resource set (CORESET) pool index of a first DCI received from the first TRP and the second TCI codepoint is indicated by a second CORESET pool index of a second DCI received from the second TRP.

Example A11 may include the one or more NTCRM of example A10, wherein the first DCI is a beam indication DCI, and wherein the instructions, when executed, are further to configure the UE to apply a default beam associated with the CORESET pool index after an initial access or a reconfiguration and before a first slot boundary after a beam application time has elapsed based on the receipt of the DCI.

Example A12 may include the one or more NTCRM of example A9, wherein the instructions, when executed, further configure the UE to: receive a first DCI from the first TRP, wherein the first DCI includes the first TCI codepoint; and receive a second DCI from the second TRP, wherein the second DCI includes the second TCI codepoint.

Example A13 may include the one or more NTCRM of example A12, wherein the instructions, when executed, further configure the UE to receive a medium access control (MAC) control element (CE) to indicate a plurality of active TCI states, wherein the first TCI codepoint indicates the one or more first TCI states from among the active TCI states.

Example A14 may include the one or more NTCRM of example A12, wherein the first DCI further includes a unified TCI state type field to indicate whether the first TCI codepoint is to indicate the joint UL-DL TCI state or the one or both of the separate UL TCI state or the separate DL TCI state.

Example A15 may include the one or more NTCRM of example A9, wherein the instructions, when executed, further configure the UE to receive a medium access control (MAC) control element (CE) with a single active TCI state that corresponds to the first TCI codepoint.

Example A16 may include the one or more NTCRM of example A9, wherein the one or more first TCI states include a joint UL/DL TCI state, or one or both of a separate UL TCI state or a separate DL TCI state for the first TRP.

Example A17 may include the one or more NTCRM of example A9, wherein the instructions when executed, further configure the UE to: receive a DCI that includes an open loop power control (OLPC) field, and identify one or more p0 values for open loop power control that are mapped from a value of the OLPC field according to a TCI state ID associated with the first TCI codepoint.

Example A18 may include the one or more NTCRM of example A9, wherein the instructions, when executed, further configure the UE to: map the one or more first TCI states to one or more p0 values; and transmit the first uplink transmission using open loop power control based on the one or more p0 values.

Example A19 may include one or more non-transitory computer-readable media (NTCRM) having instructions, stored thereon, that when executed by one or more processors of a next generation Node B (gNB) configure the gNB to: encode, for transmission to a user equipment (UE), a downlink control information (DCI) that includes a joint codepoint to indicate one or more first transmission configuration indicator (TCI) states for a first transmission-reception point (TRP) and one or more second TCI states for a second TRP; and transmit a first downlink (DL) transmission via the first TRP or receive a first uplink (UL) transmission via the first TRP based on the one or more first TCI states.

Example A20 may include the one or more NTCRM of example A19, wherein the one or more first TCI states include a joint UL/DL TCI state, or one or both of a separate UL TCI state or a separate DL TCI state for the first TRP.

Example B1 may include a method for multi-DCI based multi-TRP transmission, where TCI codepoint mapped to 1 joint DL/UL TCI state is indicated by the scheduling DCI in the case of more than single active or by MAC-CE in the case of single active TCI state.

Example B2 may include a method for multi-DCI based multi-TRP transmission, where in case of separate DL/UL TCI operation, each DCI indicates a TCI codepoint mapped to either a single (M=1) DL TCI state, a single (N=1) UL TCI state or alternatively a codepoint mapped to one DL and one UL TCI state.

Example B3 may include the method for multi-DCI based multi-TRP transmission, where a joint DL/UL or a separate DL and/or UL TCI state can be explicitly or implicitly associated with a TRP, where a TCI state may be associated with a TRP-ID or a value of the CORESETPoolIndex.

Example B4 may include the method for multi-DCI based multi-TRP transmission, where a beam indication DCI format 1_1/1_2 without DL assignment may be used to activate two joint TCI states or two DL and two UL TCI states associated with each of the two TRPs.

Example B5 may include the method for multi-DCI based multi-TRP transmission, where separate DCIs can be used to activate TCI states and the ACK for the beam indication DCI is transmitted using the UL or joint TCI associated with the TCI codepoint.

Example B6 may include the method for multi-DCI based multi-TRP transmission, where separate DL/UL TCI indication can be applied and joint HARQ-ACK feedback can be configured.

Example B7 may include the method for multi-DCI based multi-TRP transmission, where separate DL/UL TCI indication can be applied and separate HARQ-ACK feedback can be configured.

Example B8 may include the method in example B6 or some other example herein, where if the DCI scheduling the PDSCH indicates a TCI codepoint mapped to only DL TCI state, the PUCCH transmission carrying the HARQ-ACK feedback uses the UL TCI state that was active at the time of reception of the beam indication.

Example B9 may include the method in example B6 or some other example herein, where the UE does not expect to be indicated with a TCI codepoint which is mapped to only a single DL TCI state.

Example B10 may include method in example B7 or some other example herein, where the UE expects to be indicated with a TCI codepoint which is mapped to one DL and UL TCI state.

Example B11 may include the method for multi-DCI based multi-TRP transmission, where a default beam for each CORESETPoolIndex is applicable after initial access or reconfiguration and before the first slot boundary after beam application time after the UE receives a first beam indication DCI for the corresponding CORESETPoolIndex.

Example B12 may include the method in example B11 or some other example herein, where once the UE receives a beam application DCI corresponding to a CORESETPoolIndex, the indicated beam, once applied, is assumed to be active until a different TCI state is indicated either by DCI or MAC-CE.

Example B13 may include the method for single-DCI based multi-TRP transmission with unified TCI framework, where the UE can be configured with 1) joint DL/UL beam indication with the value of unifiedtci-StateType set to "JointULDL", using a joint DL/UL TCI state (DLorJointTCIState), or 2) separate DL/UL beam indication with the value of unifiedtci-StateType set to "SeparateULDL".

Example B14 may include the method in example B13 or some other example herein, where when joint DL/UL beam indication is configured, a UE expects to be indicated with a TCI codepoint which is mapped to two joint DL/UL TCI states, one for each TRP.

Example B15 may include the method in example B13 or some other example herein, where when separate DL/UL beam indication is configured, the UE expects to be indicated with a TCI codepoint which is mapped to two (M=2) DL TCI states or two (N=2) UL TCI states or two DL+two UL TCI states.

Example B16 may include method for single-DCI based multi-TRP transmission, where when 2 CDM groups are indicated using DM-RS antenna port indication tables, for joint DL/UL TCI or separate DL/UL TCI with a TCI codepoint mapped to only DL or only UL TCI states, the first TCI state is associated with the CDM group of the 1st DM-RS port, and the second TCI state is associated with the second CDM group.

Example B17 may include the method for single-DCI based multi-TRP transmission, where separate DL/UL TCI with one or more TCI codepoints mapped to two DL+two UL TCI states, the first DL and first UL TCI states are associated with the CDM group of the first indicated DM-RS port and the 2nd DL and 2nd UL TCI states are associated with the 2nd CDM group. UE does not expect to be signaled with DM-RS ports from 3 CDM groups.

Example B18 may include the method for PDSCH repetition scheme 3 and scheme 4, where when the time offset between the DCI and the 1st PDSCH transmission occasion is below the BAT, and before the UE has received the first beam indication DCI, two default beams are applied and the lowest indexed TCI codepoint which is mapped to 2 joint DL/UL or 2 DL+2 UL TCI states is considered to be the default beam.

Example B19 may include the method for PDSCH repetition scheme 3 and scheme 4, where once the UE receives a first beam indication DCI with a TCI codepoint mapped to two joint DL/UL TCI states, or 2 DL+2 UL TCI states, the indicated TCI states are assumed to be active, at the next slot boundary after the corresponding beam application time has elapsed.

Example B20 may include the method for single-DCI based PDSCH repetition scheme 3 and scheme 4, where the beam application time can be configured per CC for all TRPs and is determined based on the smallest SCS among the CCs from the TRPs which apply the indicated beams.

Example B21 may include the method for multi-TRP PDCCH repetition scheme, where CORESETs in SS-1 and SS-2 are configured by RRC per CORESET not to follow the indicated unified TCI states (joint or DL TCI state) with the value of the field followUnifiedTCIstate set to "disabled".

Example B22 may include the method for multi-TRP PDCCH repetition scheme, where CORESET-1 and CORESET-2 can be configured to apply the indicated joint or DL TCI state(s) only for the case when the indicated TCI codepoint maps to 2 joint or DL TCI states. The first TCI state in the codepoint applies to CORESET-1 and second TCI state in the codepoint maps to CORESET-2.

Example B23 may include the method for multi-TRP PUSCH repetition scheme, where an uplink DCI can be used to indicate a TCI codepoint mapped to two joint DL/UL TCI states or two UL TCI states, by adding a new TCI field in the uplink DCI formats, or by repurposing an existing field such as SRI field in the uplink DCI.

Example B24 may include the method for multi-TRP PUSCH repetition scheme, where the beam indication for PUSCH repetition can be performed using a downlink DCI format, where the TCI in DCI field indicates a TCI codepoint mapped to two joint or UL TCI states.

Example B25 may include the method in example B23 or some other example herein, where both cyclic and sequential beam mapping can be supported.

Example B26 may include the method in example B23 or some other example herein, where for cyclic beam mapping, the first TCI state mapped to the TCI codepoint corresponds the first PDSCH repetition and the second TCI state corresponds to the second PDSCH repetition and the assignment repeats.

Example B27 may include the method in example B23 or some other example herein, where for sequential beam mapping, the first TCI state corresponds first two repetitions of PUSCH and the second TCI state corresponds to the next two repetitions of the PUSCH and this assignment repeats.

Example B28 may include the method for multi-TRP PUCCH repetition scheme with unified TCI framework, where PUCCH resources or resource sets can be configured to follow the indicated Rel-17 joint or UL TCI state and DCI can indicate a TCI codepoint mapped to two joint or UL TCI states, the first TCI state maps to the first PUCCH repetition and the second TCI state maps to the second PUCCH repetition and this pattern repeats for every subsequent repetition.

Example B29 may include the method for multi-TRP PUCCH repetition scheme with unified TCI framework, where the UE can be configured via RRC on a per PUCCH resource or resource set basis to not follow the indicated joint or UL TCI state.

Example B30 may include the method for multi-TRP PUCCH repetition scheme with unified TCI framework, where a MAC-CE can associate two joint or UL TCI states with each PUCCH resource or resource set.

Example B31 may include the method for multi-TRP PUCCH repetition scheme with unified TCI framework, where MAC-CE based signaling can be used to associate two joint or UL TCI states with a group of PUCCH resources.

Example B32 may include the method for multi-TRP PUCCH repetition scheme with unified TCI framework, where if the PUCCH resource with the lowest ID is activated with two uplink or joint TCI states, the first TCI state or the TCI state with the lower ID, is used as the default beam for PUSCH scheduled by DCI format 0_0.

Example B33 may include the method for PUSCH power control, where the closed loop indexes are mapped to p0, alpha, and PL-RS according to the closed loop index value included in the RRC parameter of joint TCI state or UL TCI states, Example B34 may include the method for PUSCH power control, where a joint TPC field for multi-TRP transmission can be designed, which indicates the TPC command values for both TRPs.

Example B35 may include method for PUSCH power control, where if TCI field(s) exists, the OLPC field value is mapped to p0 value(s) according to the TCI state ID.

Example B36 may include the method for PUSCH power control, if the TCI field(s) exist and 'SRI-PUSCH-Power-Control' is configured, the TCI state ID(s) is mapped to the 'sri-PUSCH-PowerControlId'.

Example B37 may include the method for PUSCH power control, where a two-step mapping is applied to map p0s to TCI states.

a) First, mapping between TCI state IDs and SRI can be provided in RRC configuration or an activation MAC CE.

b) Second, the mapping between SRI and p0 can be based on Rel-17 rules.

Example B38 may include the method for PUSCH power control, where TCI states are mapped to the p0 values directly.

Example B39 may include the method for PUSCH power control, where a two-step mapping is applied to map PL-RS to TCI-states.

c) First, mapping between TCI state IDs and SRI IDs can be provided in RRC configuration or an activation MAC CE.

d) Second, if the UE is provided 'enablePL-RS-Update-ForPUSCH-SRS', a mapping between SRI ID and 'PUSCH-PathlossReferenceRS-Id' values can be updated by a current Rel-17 MAC CE.

Example B40 may include the method for PUSCH power control, where a new RRC parameter 'enablePL-RS-Up-dateForPUSCH-TCI' can be configured and a mapping between TCI state ID and 'PUSCH-PathlossReferenceRS-Id' values can be updated by a MAC CE.

Example B41 may include the method for PUCCH power control, where the closed loop indexes are mapped to p0 and PL-RS according to the closed loop index value included in the RRC parameter of joint TCI state or UL TCI states.

Example B42 may include the method for PUCCH power control, where a joint TPC field for multi-TRP transmission can be designed, which indicates the TPC command values for both TRPs.

Example B43 may include the method for PUCCH power control, where the 'S' field of PUCCH spatial relation activation/deactivation MAC CE can be reinterpreted as TCI state ID. And one or two TCI states can be activated/deactivated with this MAC CE.

Example B44 may include the method for PUCCH power control, where a two-step mapping is applied.

e) First, mapping between TCI state IDs and SRI IDs can be provided in RRC configuration or an activation MAC CE.

f) Second, the PUCCH spatial relation(s) is mapped to TCI state ID(s) according to the configuration or indication in the first step.

Example B45 may include the method for PUCCH power control, where a new MAC CE activation of TCI states for a PUCCH resource can be designed Example Z01 may include an apparatus comprising means to perform one or more elements of a method described in or related to any of examples A1-A20, B1-B45, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A20, B1-B45, or any other method or process described herein.

Example Z03 may include an apparatus comprising logic, modules, or circuitry to perform one or more elements of a method described in or related to any of examples A1-A20, B1-B45, or any other method or process described herein.

Example Z04 may include a method, technique, or process as described in or related to any of examples A1-A20, B1-B45, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A20, B1-B45, or portions thereof.

Example Z06 may include a signal as described in or related to any of examples A1-A20, B1-B45, or portions or parts thereof.

Example Z07 may include a datagram, packet, frame, segment, protocol data unit (PDU), or message as described in or related to any of examples A1-A20, B1-B45, or portions or parts thereof, or otherwise described in the present disclosure.

Example Z08 may include a signal encoded with data as described in or related to any of examples A1-A20, B1-B45, or portions or parts thereof, or otherwise described in the present disclosure.

Example Z09 may include a signal encoded with a datagram, packet, frame, segment, protocol data unit (PDU), or message as described in or related to any of examples A1-A20, B1-B45, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A20, B1-B45, or portions thereof.

Example Z11 may include a computer program comprising instructions, wherein execution of the program by a processing element is to cause the processing element to carry out the method, techniques, or process as described in or related to any of examples A1-A20, B1-B45, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

ABBREVIATIONS

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| 3GPP | Third Generation Partnership Project | ARP | Allocation and Retention Priority | C-RNTI | Cell Radio Network Temporary Identity |
| 4G | Fourth Generation | ARQ | Automatic Repeat Request | CA | Carrier Aggregation, |
| 5G | Fifth Generation | | | | Certification |
| 5GC | 5G Core network | AS | Access Stratum | | Authority |
| AC | Application Client | ASP | Application Service Provider | CAPEX | CAPital Expenditure |
| ACR | Application Context Relocation | ASN.1 | Abstract Syntax Notation One | CBRA | Contention Based Random Access |
| ACK | Acknowledgement | AUSF | Authentication Server Function | CC | Component Carrier, Country Code, |
| ACID | Application Client Identification | AWGN | Additive White Gaussian Noise | | Cryptographic Checksum |
| AF | Application Function | BAP | Backhaul Adaptation Protocol | CCA | Clear Channel Assessment |
| AM | Acknowledged Mode | BCH | Broadcast Channel | | |
| AMBR | Aggregate Maximum Bit Rate | BER | Bit Error Ratio | CCE | Control Channel Element |
| | | BFD | Beam Failure | | |

-continued

| | | | | | |
|---|---|---|---|---|---|
| AMF | Access and Mobility Management Function | | Detection | CCCH | Common Control Channel |
| AN | Access Network | BLER | Block Error Rate | CE | Coverage Enhancement |
| ANR | Automatic Neighbour Relation | BPSK | Binary Phase Shift Keying | CDM | Content Delivery Network |
| AOA | Angle of Arrival | BRAS | Broadband Remote Access Server | CDMA | Code-Division Multiple Access |
| AP | Application Protocol, Antenna Port, Access Point | BSS | Business Support System | CDR | Charging Data Request |
| API | Application Programming Interface | BS | Base Station | CDR | Charging Data Response |
| APN | Access Point Name | BSR | Buffer Status Report | CFRA | Contention Free Random Access |
| CG | Cell Group | BW | Bandwidth | CSI-IM | CSI Interference Measurement |
| CGF | Charging Gateway Function | BWP | Bandwidth Part | CSI-RS | CSI Reference Signal |
| CHF | Charging Function | CPD | Connection Point Descriptor | CSI-RSRP | CSI reference signal received power |
| CI | Cell Identity | CPE | Customer Premise Equipment | CSI-RSRQ | CSI reference signal received quality |
| CID | Cell-ID (e.g., positioning method) | CPICH | Common Pilot Channel | CSI-SINR | CSI signal-to-noise and interference ratio |
| CIM | Common Information Model | CQI | Channel Quality Indicator | CSMA | Carrier Sense Multiple Access |
| CIR | Carrier to Interference Ratio | CPU | CSI processing unit, Central Processing Unit | CSMA/CA | CSMA with collision avoidance |
| CK | Cipher Key | C/R | Command/Response field bit | CSS | Common Search Space, Cell-specific Search Space |
| CM | Connection Management, Conditional Mandatory | CRAN | Cloud Radio Access Network, Cloud RAN | CTF | Charging Trigger Function |
| CMAS | Commercial Mobile Alert Service | CRB | Common Resource Block | CTS | Clear-to-Send |
| CMD | Command | CRC | Cyclic Redundancy Check | CW | Codeword |
| CMS | Cloud Management System | CRI | Channel-State Information Resource Indicator, CSI-RS Resource Indicator | CWS | Contention Window Size |
| CO | Conditional Optional | C-RNTI | Cell RNTI | D2D | Device-to-Device |
| COMP | Coordinated Multi-Point | CS | Circuit Switched | DC | Dual Connectivity, Direct Current |
| CORESET | Control Resource Set | CSCF | call session control function | DCI | Downlink Control Information |
| COTS | Commercial Off-The-Shelf | CSAR | Cloud Service Archive | DF | Deployment Flavour |
| CP | Control Plane, Cyclic Prefix, Connection Point | CSI | Channel-State Information | EHE | Edge Hosting Environment |
| DL | Downlink | ECCA | extended clear channel assessment, extended CCA | EGMF | Exposure Governance Management Function |
| DMTF | Distributed Management Task Force | ECCE | Enhanced Control Channel Element, Enhanced CCE | EGPRS | Enhanced GPRS |
| DPDK | Data Plane Development Kit | ED | Energy Detection | EIR | Equipment Identity Register |
| DM-RS, DMRS | Demodulation Reference Signal | EDGE | Enhanced Datarates for GSM Evolution (GSM Evolution) | eLAA | enhanced Licensed Assisted Access, enhanced LAA |
| DN | Data network | EAS | Edge Application Server | EM | Element Manager |
| DNN | Data Network Name | EASID | Edge Application Server Identification | eMBB | Enhanced Mobile Broadband |
| DNAI | Data Network Access Identifier | ECS | Edge Configuration Server | EMS | Element Management System |
| DRB | Data Radio Bearer | ECSP | Edge Computing Service Provider | eNB | evolved NodeB, E-UTRAN Node B |
| DRS | Discovery Reference Signal | EDN | Edge Data Network | EN-DC | E-UTRA-NR Dual Connectivity |
| DRX | Discontinuous Reception | EEC | Edge Enabler Client | EPC | Evolved Packet Core |
| DSL | Domain Specific Language. Digital Subscriber Line | EECID | Edge Enabler Client Identification | EPDCCH | enhanced PDCCH, enhanced Physical Downlink Control Cannel |
| DSLAM | DSL Access Multiplexer | EES | Edge Enabler Server | | |
| DwPTS | Downlink Pilot Time Slot | EESID | Edge Enabler Server identification | | |
| E-LAN | Ethernet Local Area Network | | | | |
| E2E | End-to-End | | | | |
| EAS | Edge Application Server | | | | |

-continued

| | | | | | |
|---|---|---|---|---|---|
| EREG | enhanced REG, enhanced resource element groups | FACH | Forward Access Channel | EPRE | Energy per resource element |
| | | FAUSCH | Fast Uplink Signalling Channel | EPS | Evolved Packet System |
| ETSI | European Telecommunications Standards Institute | FB | Functional Block | FQDN | Fully Qualified Domain Name |
| | | FBI | Feedback Information | G-RNTI | GERAN Radio Network Temporary Identity |
| ETWS | Earthquake and Tsunami Warning System | FCC | Federal Communications Commission | GERAN | GSM EDGE RAN, GSM EDGE Radio Access Network |
| eUICC | embedded UICC, embedded Universal Integrated Circuit Card | FCCH | Frequency Correction CHannel | | |
| | | FDD | Frequency Division Duplex | GGSN | Gateway GPRS Support Node |
| E-UTRA | Evolved UTRA | FDM | Frequency Division Multiplex | GLONASS | GLObal'naya NAvigatsionnaya Sputnikovaya Sistema (Engl.: |
| E-UTRAN | Evolved UTRAN | FDMA | Frequency Division Multiple Access | | Global Navigation Satellite System) |
| EV2X | Enhanced V2X | FE | Front End | | |
| F1AP | F1 Application Protocol | FEC | Forward Error Correction | gNB | Next Generation NodeB |
| F1-C | F1 Control plane interface | FFS | For Further Study | gNB-CU | gNB-centralized unit, Next Generation NodeB centralized unit |
| F1-U | F1 User plane interface | FFT | Fast Fourier Transformation | | |
| FACCH | Fast Associated Control CHannel | feLAA | further enhanced Licensed Assisted Access, further enhanced LAA | gNB-DU | gNB-distributed unit, Next Generation NodeB distributed unit |
| FACCH/F | Fast Associated Control Channel/Full rate | FN | Frame Number | | |
| | | FPGA | Field-Programmable Gate Array | GNSS | Global Navigation Satellite System |
| FACCH/H | Fast Associated Control Channel/Half rate | FR | Frequency Range | GPRS | General Packet Radio Service |
| | | HSN | Hopping Sequence Number | | |
| GSM | Global System for Mobile Communications, Groupe Spécial Mobile | HSPA | High Speed Packet Access | GPSI | Generic Public Subscription Identifier |
| | | HSS | Home Subscriber Server | IEI | Information Element Identifier |
| GTP | GPRS Tunneling Protocol | HSUPA | High Speed Uplink Packet Access | IEIDL | Information Element Identifier Data Length |
| GTP-UGPRS | Tunnelling Protocol for User Plane | HTTP | Hyper Text Transfer Protocol | | |
| | | HTTPS | Hyper Text Transfer Protocol Secure (https is http/1.1 over SSL, i.e. port 443) | IETF | Internet Engineering Task Force |
| GTS | Go To Sleep Signal (related to WUS) | | | IF | Infrastructure |
| GUMMEI | Globally Unique MME Identifier | | | IIOT | Industrial Internet of Things |
| GUTI | Globally Unique Temporary UE Identity | I-Block | Information Block | IM | Interference Measurement, Intermodulation, IP Multimedia |
| HARQ | Hybrid ARQ, Hybrid Automatic Repeat Request | ICCID | Integrated Circuit Card Identification | | |
| | | IAB | Integrated Access and Backhaul | IMC | IMS Credentials |
| HANDO | Handover | | | IMEI | International Mobile Equipment Identity |
| HFN | HyperFrame Number | ICIC | Inter-Cell Interference Coordination | IMGI | International mobile group identity |
| HHO | Hard Handover | ID | Identity, identifier | | |
| HLR | Home Location Register | IDFT | Inverse Discrete Fourier Transform | IMPI | IP Multimedia Private Identity |
| HN | Home Network | IE | Information element | IMPU | IP Multimedia PUblic identity |
| HO | Handover | IBE | In-Band Emission | | |
| HPLMN | Home Public Land Mobile Network | IEEE | Institute of Electrical and Electronics Engineers | IMS | IP Multimedia Subsystem |
| HSDPA | High Speed Downlink Packet Access | Ki | Individual subscriber authentication key | IMSI | International Mobile Subscriber Identity |
| | | | | IOT | Internet of Things |
| IP-CAN | IP-Connectivity Access Network | KPI | Key Performance Indicator | IP | Internet Protocol |
| | | | | Ipsec | IP Security, Internet Protocol Security |
| IP-M | IP Multicast | KQI | Key Quality Indicator | LI | Layer Indicator |
| IPv4 | Internet Protocol Version 4 | KSI | Key Set Identifier | LLC | Logical Link Control, Low Layer Compatibility |
| IPV6 | Internet Protocol Version 6 | ksps | kilo-symbols per second | | |
| | | | | LMF | Location Management Function |
| IR | Infrared | KVM | Kernel Virtual Machine | LOS | Line of Sight |
| IS | In Sync | | | | |
| IRP | Integration Reference Point | L1 | Layer 1 (physical layer) | LPLMN | Local PLMN |
| | | | | LPP | LTE Positioning Protocol |
| ISDN | Integrated Services Digital Network | L1-RSRP | Layer 1 reference signal | LSB | Least Significant Bit |

-continued

| | | | | | |
|---|---|---|---|---|---|
| ISIM | IM Services Identity Module | | received power | LTE | Long Term Evolution |
| ISO | International Organisation for Standardisation | L2 | Layer 2 (data link layer) | LWA | LTE-WLAN aggregation |
| | | L3 | Layer 3 (network layer) | LWIP | LTE/WLAN Radio Level Integration with IPsec Tunnel |
| ISP | Internet Service Provider | LAA | Licensed Assisted Access | | |
| IWF | Interworking-Function | LAN | Local Area Network | LTE | Long Term Evolution |
| I-WLAN | Interworking WLAN | LADN | Local Area Data Network | M2M | Machine-to-Machine |
| | Constraint length of the convolutional code, | LBT | Listen Before Talk | MAC | Medium Access Control (protocol layering context) |
| | | LCM | LifeCycle Management | | |
| USIM | Individual key | LCR | Low Chip Rate | | |
| Kb | Kilobyte (1000 bytes) | LCS | Location Services | MAC | Message authentication code (security/encryption context) |
| | | LCID | Logical Channel ID | | |
| kbps | kilo-bits per second | | | | |
| Kc | Ciphering key | MIB | Master Information Block, Management Information Base | | |
| MAC-IMAC | used for data integrity of signalling messages (TSG T WG3 context) | | | MAC-A | MAC used for authentication and key agreement (TSG T WG3 context) |
| | | MIMO | Multiple Input Multiple Output | | |
| MANO | Management and Orchestration | MLC | Mobile Location Centre | MPLS | MultiProtocol Label Switching |
| MBMS | Multimedia Broadcast and Multicast Service | MM | Mobility Management | MS | Mobile Station |
| | | | | MSB | Most Significant Bit |
| | | MME | Mobility Management Entity | MSC | Mobile Switching Centre |
| MBSFN | Multimedia Broadcast multicast service Single Frequency Network | MN | Master Node | MSI | Minimum System Information, MCH Scheduling Information |
| | | MNO | Mobile Network Operator | | |
| MCC | Mobile Country Code | MO | Measurement Object, Mobile Originated | MSID | Mobile Station Identifier |
| MCG | Master Cell Group | | | MSIN | Mobile Station Identification Number |
| MCOT | Maximum Channel Occupancy Time | MPBCH | MTC Physical Broadcast CHannel | | |
| MCS | Modulation and coding scheme | MPDCCH | MTC Physical Downlink Control CHannel | MSIDDN | Mobile Subscriber ISDN Number |
| MDAF | Management Data Analytics Function | | | MT | Mobile Terminated, Mobile Termination |
| MDAS | Management Data Analytics Service | MPDSCH | MTC Physical Downlink Shared CHannel | MTC | Machine-Type Communications mMTCmassive MTC, massive Machine-Type Communications |
| MDT | Minimization of Drive Tests | MPRACH | MTC Physical Random Access CHannel | | |
| ME | Mobile Equipment | | | | |
| MeNB | master eNB | | | | |
| MER | Message Error Ratio | MPUSCH | MTC Physical Uplink Shared Channel | MU-MIMO | Multi User MIMO |
| MGL | Measurement Gap Length | | | MWUS | MTC wake-up signal, MTC WUS |
| MGRP | Measurement Gap Repetition Period | N-POP | Network Point of Presence | NACK | Negative Acknowledgement |
| NAS | Non-Access Stratum, Non- Access Stratum layer | NMIB, N-MIB | Narrowband MIB | NAI | Network Access Identifier |
| | | NPBCH | Narrowband Physical Broadcast CHannel | | |
| NCT | Network Connectivity Topology | | | NS | Network Service |
| NC-JT | Non- Coherent Joint Transmission | NPDCCH | Narrowband Physical Downlink Control CHannel | NSA | Non-Standalone operation mode |
| | | | | NSD | Network Service Descriptor |
| NEC | Network Capability Exposure | NPDSCH | Narrowband Physical Downlink Shared CHannel | NSR | Network Service Record |
| NE-DC | NR-E-UTRA Dual Connectivity | NPRACH | Narrowband Physical Random Access CHannel | NSSAI | Network Slice Selection Assistance Information |
| NEF | Network Exposure Function | | | S-NNSAI | Single-NSSAI |
| NF | Network Function | NPUSCH | Narrowband Physical Uplink Shared CHannel | NSSF | Network Slice Selection Function |
| NFP | Network Forwarding Path | | | | |
| NFPD | Network Forwarding Path Descriptor | NPSS | Narrowband Primary Synchronization Signal | NW | Network |
| | | | | NWUS | Narrowband wake-up signal, Narrowband WUS |
| NFV | Network Functions Virtualization | NSSS | Narrowband Secondary Synchronization Signal | NZP | Non-Zero Power |
| NFVI | NFV Infrastructure | | | O&M | Operation and Maintenance |
| NFVO | NFV Orchestrator | | | | |
| NG | Next Generation, Next Gen | NR | New Radio, | ODU2 | Optical channel Data Unit-type 2 |

| | | | | | |
|---|---|---|---|---|---|
| NGEN-DC UTRA-NR | NG-RAN E-Dual Connectivity | NRF | Neighbour Relation NF Repository Function | OFDM | Orthogonal Frequency Division Multiplexing |
| NM | Network Manager | NRS | Narrowband Reference Signal | OFDMA | Orthogonal Frequency Division Multiple Access |
| NMS | Network Management System | PDCCH | Physical Downlink Control Channel | OOB | Out-of-band |
| OSI | Other System Information | | | OOS | Out of Sync |
| OSS | Operations Support System | PDCP | Packet Data Convergence Protocol | OPEX | OPerating EXpense |
| OTA | over-the-air | PDN | Packet Data Network, Public Data Network | PNFR | Physical Network Function Record |
| PAPR | Peak-to-Average Power Ratio | | | POC | PTT over Cellular |
| PAR | Peak to Average Ratio | PDSCH | Physical Downlink Shared Channel | PP, PTP | Point-to-Point |
| PBCH | Physical Broadcast Channel | PDU | Protocol Data Unit | PPP | Point-to-Point Protocol |
| PC | Power Control, Personal Computer | PEI | Permanent Equipment Identifiers | PRACH | Physical RACH |
| PCC | Primary Component Carrier, Primary CC | PFD | Packet Flow Description | PRB | Physical resource block |
| P-CSCF | Proxy CSCF PCell Primary Cell | P-GW | PDN Gateway | PRG | Physical resource block group |
| PCI | Physical Cell ID, Physical Cell Identity | PHICH | Physical hybrid-ARQ indicator channel | ProSe | Proximity Services, Proximity-Based Service |
| PCEF | Policy and Charging Enforcement Function | PHY | Physical layer | PRS | Positioning Reference Signal |
| PCF | Policy Control Function | PLMN | Public Land Mobile Network | PRR | Packet Reception Radio |
| PCRF | Policy Control and Charging Rules Function | PIN | Personal Identification Number | PS | Packet Services |
| PDCP | Packet Data Convergence Protocol, Packet Data Convergence Protocol layer | PM | Performance Measurement | PSBCH | Physical Sidelink Broadcast Channel |
| | | PMI | Precoding Matrix Indicator | PSDCH | Physical Sidelink Downlink Channel |
| PSFCH | physical sidelink feedback channel | PNF | Physical Network Function | PSCCH | Physical Sidelink Control Channel |
| PSCell | Primary SCell | PNFD | Physical Network Function Descriptor | PSSCH | Physical Sidelink Shared Channel |
| PSS | Primary Synchronization Signal | RAB | Radio Access Bearer, Random Access Burst | RLC | Radio Link Control, Radio Link Control layer |
| PSTN | Public Switched Telephone Network | RACH | Random Access Channel | RLC AM | RLC Acknowledged Mode |
| | | RADIUS | Remote Authentication Dial In User Service | | |
| PT-RS | Phase-tracking reference signal | RAN | Radio Access Network | RLC UM | RLC Unacknowledged Mode |
| PTT | Push-to-Talk | RAND | RANDom number (used for authentication) | RLF | Radio Link Failure |
| PUCCH | Physical Uplink Control Channel | | | RLM | Radio Link Monitoring |
| PUSCH | Physical Uplink Shared Channel | RAR | Random Access Response | RLM-RS | Reference Signal for RLM |
| | | RAT | Radio Access Technology | RM | Registration Management |
| QAM | Quadrature Amplitude Modulation | RAU | Routing Area Update | RMC | Reference Measurement Channel |
| QCI | QoS class of identifier | RB | Resource block, Radio Bearer | RMSI | Remaining MSI, Remaining Minimum System Information |
| QCL | Quasi co-location | RBG | Resource block group | | |
| QFI | QOS Flow ID, QoS Flow Identifier | REG | Resource Element Group | RN | Relay Node |
| QoS | Quality of Service | Rel | Release | RNC | Radio Network Controller |
| QPSK | Quadrature (Quaternary) Phase Shift Keying | REQ | REQuest | RNL | Radio Network Layer |
| | | RF | Radio Frequency | RNTI | Radio Network Temporary Identifier |
| QZSS | Quasi-Zenith Satellite System | RI | Rank Indicator | | |
| | | RIV | Resource indicator value | ROHC | RObust Header Compression |
| RA-RNTI | Random Access RNTI | RL | Radio Link | RRC | Radio Resource Control, Radio Resource Control layer |
| RSRP | Reference Signal Received Power | SAP | Service Access Point | | |
| RSRQ | Reference Signal Received Quality | SAPD | Service Access Point Descriptor | RRM | Radio Resource Management |
| RSSI | Received Signal Strength Indicator | SAPI | Service Access Point Identifier | RS | Reference Signal |
| | | | | SDNF | Structured Data Storage Network Function |
| RSU | Road Side Unit | SCC | Secondary Component Carrier, Secondary CC | | |
| RSTD | Reference Signal Time Difference | | | SDP | Session Description |

| | | | | | |
|---|---|---|---|---|---|
| RTP | Real Time Protocol | SCell | Secondary Cell | | Protocol |
| RTS | Ready-To-Send | SCEF | Service | SDSF | Structured Data |
| RTT | Round Trip Time | | Capability Exposure | | Storage Function |
| Rx | Reception, | | Function | SDT | Small Data |
| | Receiving, Receiver | SC-FDMA | Single | | Transmission |
| S1AP | S1 Application | | Carrier Frequency | SDU | Service Data Unit |
| | Protocol | | Division Multiple | SEAF | Security Anchor |
| S1-MME | S1 for the | | Access | | Function |
| | control plane | SCG | Secondary Cell | SeNB | secondary eNB |
| S1-U | S1 for the user place | | Group | SEPP | Security Edge |
| S-CSCF | serving | SCM | Security Context | | Protection Proxy |
| | CSCF | | Management | SFI | Slot format |
| S-GW | Serving Gateway | SCS | Subcarrier Spacing | | indication |
| S-RNTI | SRNC Radio | SCTP | Stream Control | SFTD | Space-Frequency |
| | Network Temporary | | Transmission | | Time Diversity, SFN and |
| | Identity | | Protocol | | frame timing difference |
| S-TMI | SAE | SDAP | Service Data | SFN | System Frame |
| | Temporary Mobile | | Adaptation Protocol, | | Number |
| | Station Identifier | | Service Data Adaptation | SgNB | Secondary gNB |
| SA | Standalone | | Protocol layer | SGSN | Serving GPRS |
| | operation mode | SDL | Supplementary | | Support Node |
| SAE | System Architecture | | Downlink | S-GW | Serving Gateway |
| | Evolotion | SS | Synchronization | SI | System Information |
| SIP | Session Initiated | | Signal | SI-RNTI | System |
| | Protocol | SSB | Synchronization | | Information RNTI |
| SIP | System in Package | | Signal Block | SIB | System Information |
| SL | Sidelink | SSID | Service Set | | Block |
| SLA | Service Level | | Identifier | SIM | Subscriber Identity |
| | Agreement | SS/PBCH | Block | | Module |
| SM | Session | SSBRI SS/ | Block | SSSG | Search Space Set |
| | Management | PBCH | Resource Indicator, | | Group |
| SMF | Session | | Synchronization | SSSIF | Search Space Set |
| | Management Function | | Signal Block | | Indicator |
| SMS | Short Message | | Resource Indicator | SST | Slice/Service Types |
| | Service | SSC | Session and Service | SU-MIMO | Single User |
| SMSF | SMS Function | | Continuity | | MIMO |
| SMTC | SSB-based | SS-RSRP | Synchronization | SUL | Supplementary |
| | Measurement Timing | | Signal based Reference | | Uplink |
| | Configuration | | Signal Received | TA | Timing Advance, |
| SN | Secondary Node, | | Power | | Tracking Area |
| | Sequence Number | SS-RSRQ | Synchronization | TAC | Tracking Area Code |
| SoC | System on Chip | | Signal based Reference | TAG | Timing Advance |
| SON | Self-Organizing | | Signal Received | | Group |
| | Network | | Quality | TAI | Tracking |
| SpCell | Special Cell | SS-SINR | Synchronization | | Area Identity |
| SP-CSI-RNTI | Semi- | | Signal based Signal to | TAU | Tracking Area |
| | Persistent CSI RNTI | | Noise and Interference | | Update |
| SPS | Semi-Persistent | | Ratio | TB | Transport Block |
| | Scheduling | SSS | Secondary | TBS | Transport Block |
| SQN | Sequence number | | Synchronization | | Size |
| SR | Scheduling Request | | Signal | TBD | To Be Defined |
| SRB | Signalling Radio | | Receiver and | TCI | Transmission |
| | Bearer | | Transmitter | | Configuration Indicator |
| SRS | Sounding Reference | UCI | Uplink Control | TCP | Transmission |
| | Signal | | Information | | Communication |
| TE | Terminal Equipment | UE | User Equipment | | Protocol |
| TEID | Tunnel End Point | UDM | Unified Data | TDD | Time Division |
| | Identifier | | Management | | Duplex |
| TFT | Traffic Flow | UDP | User Datagram | TDM | Time Division |
| | Template | | Protocol | | Multiplexing |
| TMSI | Temporary Mobile | UDSF | Unstructured Data | TDMA | Time Division |
| | Subscriber Identity | | Storage Network | | Multiple Access |
| TNL | Transport Network | | Function | USIM | Universal |
| | Layer | UICC | Universal Integrated | | Subscriber Identity Module |
| TPC | Transmit Power | | Circuit Card | USS | UE-specific search |
| | Control | UL | Uplink | | space |
| TPMI | Transmitted | UM | Unacknowledged | UTRA | UMTS Terrestrial |
| | Precoding Matrix | | Mode | | Radio Access |
| | Indicator | UML | Unified Modelling | UTRAN | Universal |
| TR | Technical Report | | Language | | Terrestrial Radio |
| TRP, TRxP | Transmission | UMTS | Universal Mobile | | Access Network |
| | Reception Point | | Telecommunications | UwPTS | Uplink Pilot |
| TRS | Tracking Reference | | System | | Time Slot |
| | Signal | UP | User Plane | V2I | Vehicle-to- |
| TRx | Transceiver | UPF | User Plane Function | | Infrastructure |
| TS | Technical | URI | Uniform Resource | V2P | Vehicle-to- |
| | Specifications, | | Identifier | | Pedestrian |
| | Technical Standard | URL | Uniform Resource | V2V | Vehicle-to-Vehicle |

-continued

| | | | | | |
|---|---|---|---|---|---|
| TTI | Transmission Time Interval | URLLC | Locator Ultra- Reliable and Low Latency | V2X | Vehicle-to- everything |
| Tx | Transmission, Transmitting, Transmitter | USB | Universal Serial Bus | VIM | Virtualized Infrastructure Manager |
| U-RNTI | UTRAN Radio Network Temporary Identity | | | VL | Virtual Link, |
| | | | | VLAN | Virtual LAN, Virtual Local Area Network |
| UART | Universal Asynchronous | | | VM | Virtual Machine |
| VOIP | Voice-over-IP, Voice-over- Internet Protocol | | | VNF | Virtualized Network Function |
| | | | | VNFFG | VNF Forwarding Graph |
| VPLMN | Visited Public Land Mobile Network | | | VNFFGD | VNF Forwarding Graph Descriptor |
| VPN | Virtual Private Network | | | VNFM | VNF Manager |
| VRB | Virtual Resource Block | | | | |
| WiMAX | Worldwide Interoperability for Microwave Access | | | | |
| WLAN | Wireless Local Area Network | | | | |
| WMAN | Wireless Metropolitan Area Network | | | | |
| WPAN | Wireless Personal Area Network | | | | |
| X2-C | X2-Control plane | | | | |
| X2-U | X2-User plane | | | | |
| XML | extensible Markup Language | | | | |
| XRES | Expected user RESponse | | | | |
| XOR | exclusive OR | | | | |
| ZC | Zadoff-Chu | | | | |
| ZP | Zero Power | | | | |

TERMINOLOGY

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/ or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors of a user equipment (UE) configure the UE to:

receive downlink control information (DCI) that includes a joint codepoint to indicate one or more first transmission configuration indicator (TCI) states for a first transmission-reception point (TRP) and one or more second TCI states for a second TRP;

operate, based on the DCI, in one of a single-TRP mode and a multi-TRP mode;

in the single-TRP mode, receive a first downlink (DL) transmission from the first TRP or transmit a first uplink (UL) transmission to the first TRP based on the one or more first TCI states; and in the multi-TRP mode:

receive the DL transmission from the first TRP or transmit the UL transmission to the first TRP based on the one or more first TCI states, and receive a second DL transmission from the second TRP or transmit a second uplink transmission to the second TRP based on the one or more second TCI states, wherein for each of the first TRP and the second TRP:

a beam application time is configured for each component carrier associated with a respective TRP of the first TRP and the second TRP, and the beam application time for a given component carrier associated with the respective TRP is determined based on a smallest subcarrier spacing among the component carriers associated with both the first TRP and the second TRP that are scheduled to use the first and second TCI states indicated by the DCI, wherein for each of the first TRP and the second TRP:

the beam application time for each component carrier associated with the respective TRP begins upon receipt of the DCI that indicates the first and second TCI states for the first TRP and the second TRP, and after the beam application time for a given component carrier associated with the respective TRP has elapsed, the first TCI state indicated by the DCI for the first TRP and component carrier or the second TCI state indicated by the DCI for the second TRP and component carrier respectively becomes active at a next slot boundary.

2. The one or more NTCRM of claim 1, wherein the one or more first TCI states include at least one of:

a joint UL/DL TCI state, one or both of a separate UL TCI state, or a separate DL TCI state for the first TRP.

3. The one or more NTCRM of claim 2, wherein the DCI further includes a unified TCI state type field to indicate whether the joint codepoint is to indicate at least one of:

a joint UL/DL TCI state, the one or both of the separate UL TCI state, or the separate DL TCI state.

4. The one or more NTCRM of claim 1, wherein the joint codepoint is a first joint codepoint, and wherein the instructions, when executed, are further to configure the UE to receive a medium access control (MAC) control element (CE) to map a plurality of joint codepoints, including the first joint codepoint, to respective sets of TCI state information.

5. The one or more NTCRM of claim 1, wherein the DCI schedules:

the first DL transmission, the first UL transmission and the second DL transmission, or the second UL transmission.

6. The one or more NTCRM of claim 1, wherein the DCI includes an open loop power control (OLPC) field, and wherein the instructions when executed, further configure the UE to:

identify one or more p0 values for open loop power control that are mapped from a value of the OLPC field according to a TCI state ID associated with the joint codepoint.

7. The one or more NTCRM of claim 1, wherein the instructions, when executed, further configure the UE to:

map the one or more first TCI states to one or more p0 values; and transmit the first uplink transmission using open loop power control based on the one or more p0 values.

8. The one or more NTCRM of claim 1, wherein the instructions, when executed, further configure the UE to apply a default TCI state for a particular TRP after initial access or reconfiguration and before receipt and application of an explicit beam indication for the particular TRP, the default TCI state pre-configured based on a default policy.

\* \* \* \* \*